(12) United States Patent
Snelgrove

(10) Patent No.: US 12,591,633 B2
(45) Date of Patent: Mar. 31, 2026

(54) COMPUTATIONAL MEMORY

(71) Applicant: UNTETHER AI CORPORATION, Toronto (CA)

(72) Inventor: William Martin Snelgrove, Toronto (CA)

(73) Assignee: UNTETHER AI CORPORATION, Toronto (CA)

( * ) Notice: Subject to any disclaimer, the term of this patent is extended or adjusted under 35 U.S.C. 154(b) by 35 days.

(21) Appl. No.: 18/830,123

(22) Filed: Sep. 10, 2024

(65) Prior Publication Data

US 2025/0005104 A1 Jan. 2, 2025

Related U.S. Application Data

(63) Continuation of application No. 17/675,729, filed on Feb. 18, 2022, now Pat. No. 12,124,530, which is a
(Continued)

(51) Int. Cl.
*G06F 17/16* (2006.01)
*G06F 7/53* (2006.01)
(Continued)

(52) U.S. Cl.
CPC ............ *G06F 17/16* (2013.01); *G06F 7/5324* (2013.01); *G06F 7/5443* (2013.01); *G06F 7/575* (2013.01); *G06F 9/30101* (2013.01)

(58) Field of Classification Search
None
See application file for complete search history.

(56) References Cited

U.S. PATENT DOCUMENTS 4,809,347 A 2/1989 Nash et al.
5,038,386 A * 8/1991 Li ...................... G06F 15/8023
382/302
(Continued)

FOREIGN PATENT DOCUMENTS

WO WO-2014007845 A1 1/2014

OTHER PUBLICATIONS

Beivide, Ramon, et al. "Optimized mesh-connected networks for SIMD and MIMD architectures." Proceedings of the 14th annual international symposium on Computer architecture. 1987.
(Continued)

*Primary Examiner* — Eric Coleman
(74) *Attorney, Agent, or Firm* — Perry + Currier

(57) ABSTRACT

A processing device includes a two-dimensional array of processing elements, each processing element including an arithmetic logic unit to perform an operation. The device further includes interconnections among the two-dimensional array of processing elements to provide direct communication among neighboring processing elements of the two-dimensional array of processing elements. A processing element of the two-dimensional array of processing elements is connected to a first neighbor processing element that is immediately adjacent the processing element in a first dimension of the two-dimensional array. The processing element is further connected to a second neighbor processing element that is immediately adjacent the processing element in a second dimension of the two-dimensional array.

6 Claims, 22 Drawing Sheets

Related U.S. Application Data continuation-in-part of application No. 16/815,535, filed on Mar. 11, 2020, now Pat. No. 11,256,503.

(60) Provisional application No. 62/983,076, filed on Feb. 28, 2020, provisional application No. 62/929,233, filed on Nov. 1, 2019, provisional application No. 62/904,142, filed on Sep. 23, 2019, provisional application No. 62/887,925, filed on Aug. 16, 2019, provisional application No. 62/816,380, filed on Mar. 11, 2019.

(51) Int. Cl.
| | |
|---|---|
| *G06F 7/544* | (2006.01) |
| *G06F 7/575* | (2006.01) |
| *G06F 9/30* | (2018.01) |

(56) References Cited

U.S. PATENT DOCUMENTS

| | | | |
|---|---|---|---|
| 5,258,934 | A | 11/1993 | Agranat et al. |
| 5,268,856 | A | 12/1993 | Wilson |
| 5,345,408 | A | 9/1994 | Hoogenboom |
| 5,537,562 | A | 7/1996 | Gallup et al. |
| 5,600,582 | A | 2/1997 | Miyaguchi |
| 5,627,943 | A | 5/1997 | Yoneda et al. |
| 5,689,661 | A | 11/1997 | Hayashi et al. |
| 5,689,719 | A | 11/1997 | Miura et al. |
| 5,729,758 | A | 3/1998 | Inoue et al. |
| 5,822,608 | A | 10/1998 | Dieffenderfer et al. |
| 5,903,771 | A | 5/1999 | Sgro et al. |
| 5,956,274 | A | 9/1999 | Elliott et al. |
| 6,067,609 | A * | 5/2000 | Meeker ............... G06F 15/8023 712/15 |
| 6,145,072 | A | 11/2000 | Shams et al. |
| 6,167,501 | A | 12/2000 | Barry et al. |
| 6,279,088 | B1 | 8/2001 | Elliott et al. |
| 6,405,185 | B1 | 6/2002 | Pechanek et al. |
| 6,560,684 | B2 | 5/2003 | Elliott et al. |
| 6,590,419 | B1 | 7/2003 | Betz et al. |
| 6,675,187 | B1 | 1/2004 | Greenberger |
| 6,681,316 | B1 | 1/2004 | Clermidy et al. |
| 6,754,684 | B1 | 6/2004 | Kotlov |
| 6,883,084 | B1 | 4/2005 | Donohoe |
| 7,155,581 | B2 | 12/2006 | Elliott et al. |
| 7,418,579 | B2 | 8/2008 | Guibert et al. |
| 8,275,820 | B2 | 9/2012 | Jhang et al. |
| 8,443,169 | B2 | 5/2013 | Pechanek |
| 8,769,216 | B2 | 7/2014 | Fossum |
| 8,812,905 | B2 | 8/2014 | Sutardja et al. |
| 10,175,839 | B2 | 1/2019 | Srivastava et al. |
| 10,331,282 | B2 | 6/2019 | Srivastava et al. |
| 10,346,944 | B2 | 7/2019 | Nurvitadhi et al. |
| 10,387,122 | B1 | 8/2019 | Olsen |
| 10,706,498 | B2 | 7/2020 | Nurvitadhi et al. |
| 10,936,408 | B2 | 3/2021 | Wu |
| 2002/0198911 | A1 * | 12/2002 | Blomgren ............. G06F 9/3001 712/E9.034 |
| 2003/0179631 | A1 | 9/2003 | Koob et al. |
| 2004/0103264 | A1 | 5/2004 | Fujii et al. |
| 2004/0133750 | A1 | 7/2004 | Stewart et al. |
| 2005/0226337 | A1 | 10/2005 | Dorojevets et al. |
| 2006/0161607 | A1 * | 7/2006 | Gustavson ................ G06F 7/78 708/200 |
| 2007/0033369 | A1 * | 2/2007 | Kasama .............. G06F 15/8007 711/170 |
| 2010/0122070 | A1 | 5/2010 | Guevorkian et al. |
| 2010/0211757 | A1 | 8/2010 | Park et al. |
| 2011/0185151 | A1 | 7/2011 | Whitaker et al. |
| 2012/0216012 | A1 | 8/2012 | Vorbach et al. |
| 2013/0103925 | A1 | 4/2013 | Meeker |
| 2015/0310311 | A1 | 10/2015 | Shi et al. |
| 2016/0148901 | A1 * | 5/2016 | Alvarez-Icaza Rivera ................. H10D 89/10 257/773 |
| 2017/0148371 | A1 | 5/2017 | Qian |
| 2017/0206089 | A1 * | 7/2017 | Hosoi ..................... G06F 17/16 |
| 2018/0157970 | A1 | 6/2018 | Henry et al. |
| 2018/0336165 | A1 * | 11/2018 | Phelps .................. G06N 3/048 |
| 2019/0004878 | A1 | 1/2019 | Adler et al. |
| 2019/0018794 | A1 | 1/2019 | Beard et al. |
| 2019/0065151 | A1 | 2/2019 | Chen et al. |
| 2019/0095776 | A1 | 3/2019 | Kfir et al. |
| 2019/0138922 | A1 | 5/2019 | Liu et al. |
| 2019/0303168 | A1 | 10/2019 | Fleming, Jr. et al. |
| 2020/0034145 | A1 * | 1/2020 | Bainville ............ G06F 9/30038 |
| 2020/0145926 | A1 | 5/2020 | Velusamy |
| 2020/0202200 | A1 | 6/2020 | Son et al. |
| 2020/0279349 | A1 | 9/2020 | Nurvitadhi et al. |
| 2021/0264247 | A1 | 8/2021 | Kang et al. |

OTHER PUBLICATIONS

Serrano, Mauricio J. et al. "Optimal architectures and algorithms for mesh-connected parallel computers with separable row/column buses." IEEE transactions on parallel and distributed systems 4.10 (1993): 1073-1080.

Svensson, B., "SIMD processor array architectures", May 16, 1990, pp. 1-44.

Castaneda, Oscar, et al. "PPAC: A versatile in-memory accelerator for matrix-vector-product-like operations." 2019 IEEE 30th International Conference on Application-specific Systems, Architectures and Processors (ASAP). vol. 2160. IEEE, 2019.

Kondo, Toshio et al., "Two-Dimensional Array Processor AAP2 and Its Programming Language." Systems and computers in Japan 20.12 (1989): 14-22.

Slotnick, Daniel L. et al., "The SOLOMON computer." Proceedings of the Dec. 4-6, 1962, fall joint computer conference. 1962.

* cited by examiner

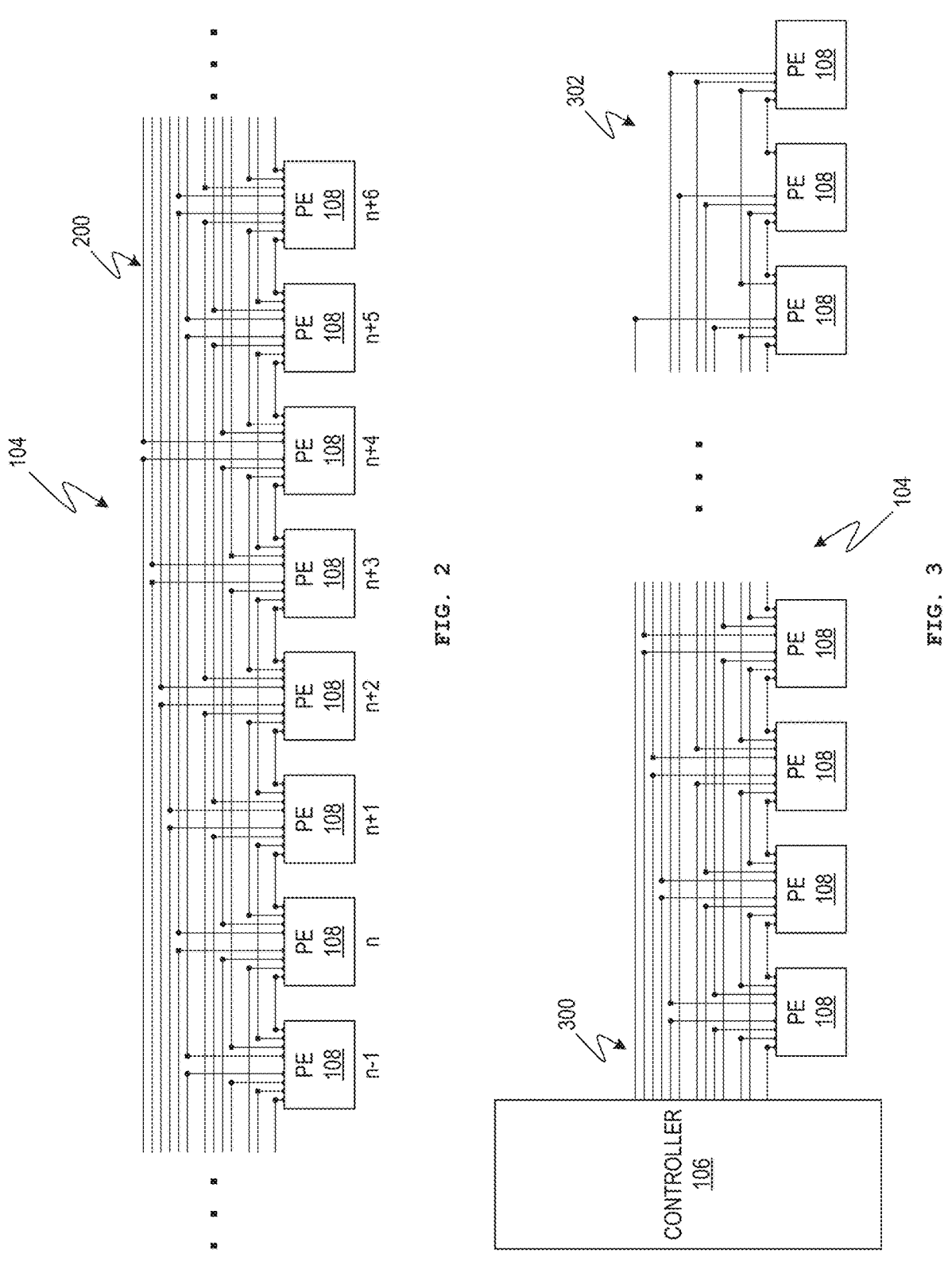

$$\begin{bmatrix} d_0 \\ d_1 \\ d_2 \\ d_3 \end{bmatrix} = \begin{bmatrix} c_{00} & c_{01} & c_{02} & c_{03} \\ c_{10} & c_{11} & c_{12} & c_{13} \\ c_{20} & c_{21} & c_{22} & c_{23} \\ c_{30} & c_{31} & c_{32} & c_{33} \end{bmatrix} \begin{bmatrix} a_0 \\ a_1 \\ a_2 \\ a_3 \end{bmatrix}$$

1400
1402
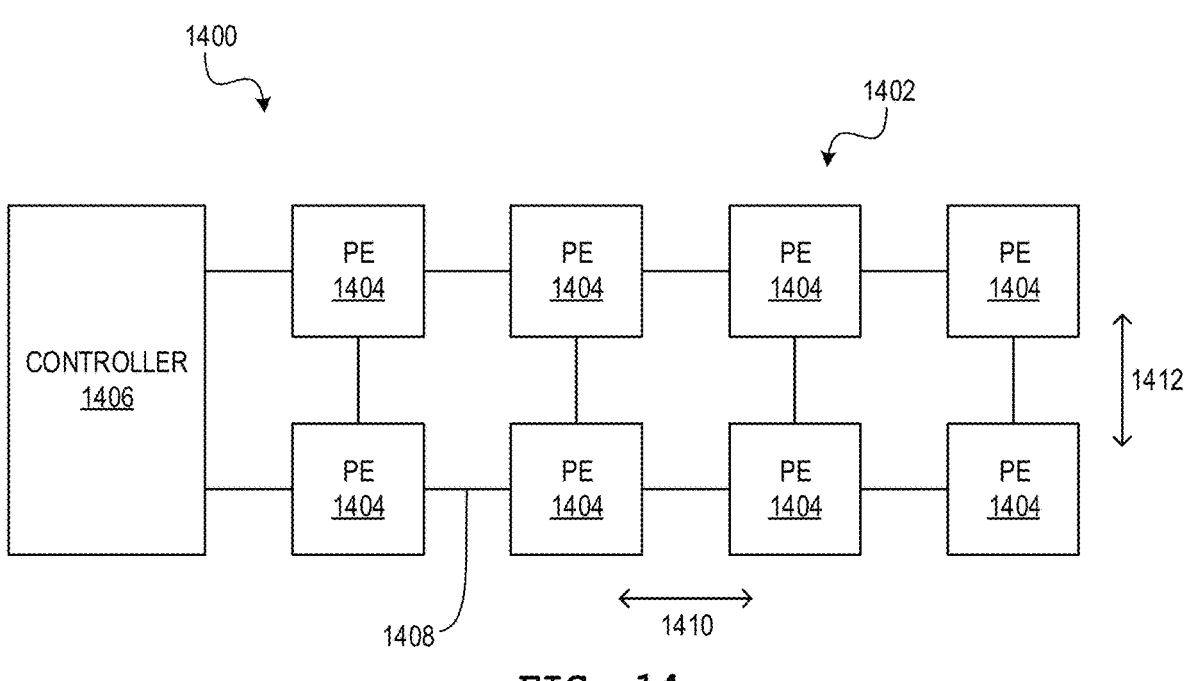
FIG. 14
FIG. 15A
FIG. 15B
FIG. 15C
FIG. 15D
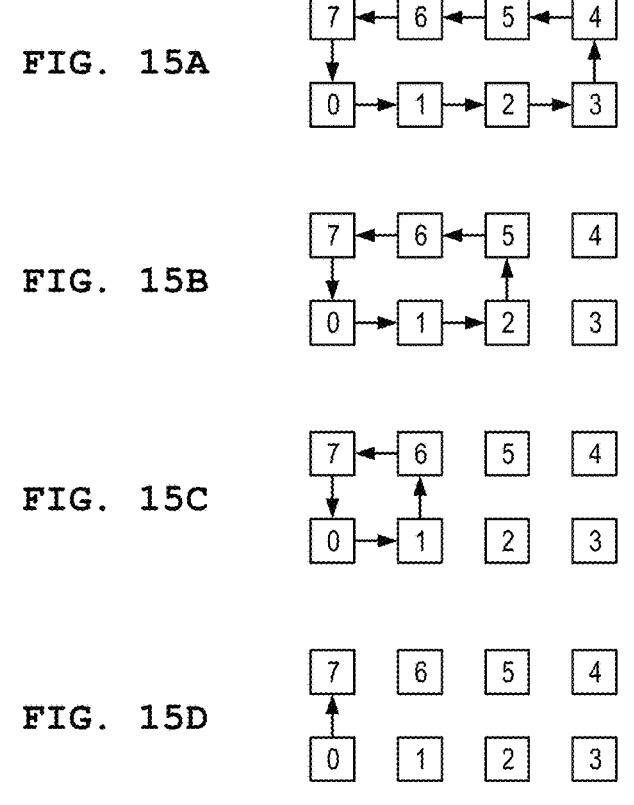

1600

1602

| | | | |
|---|---|---|---|
| PE 1404 | PE 1404 | PE 1404 | PE 1404 |
| PE 1404 | PE 1404 | PE 1404 | PE 1404 |
| PE 1404 | PE 1404 | PE 1404 | PE 1404 |
| PE 1404 | PE 1404 | PE 1404 | PE 1404 |

CONTROLLER 1406

1412

1408

1410

$$\begin{bmatrix} d_0 \\ d_1 \end{bmatrix} = \begin{bmatrix} c_{00} & c_{01} \\ c_{10} & c_{11} \end{bmatrix} \begin{bmatrix} a_0 \\ a_1 \end{bmatrix}$$
FIG. 20
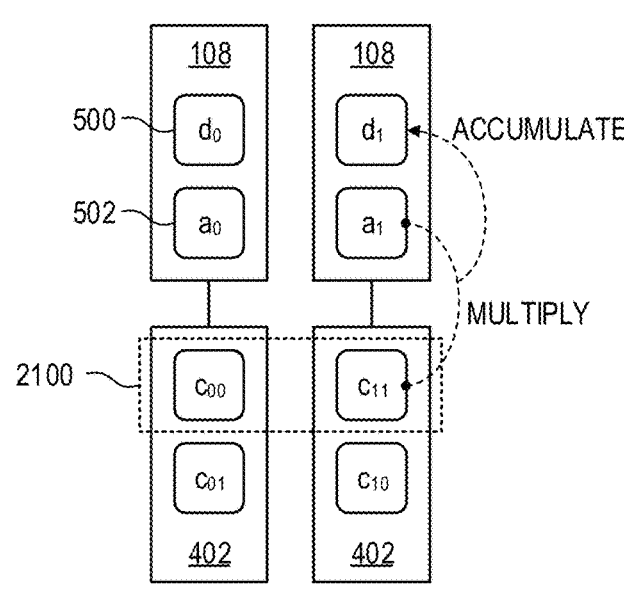
FIG. 21A
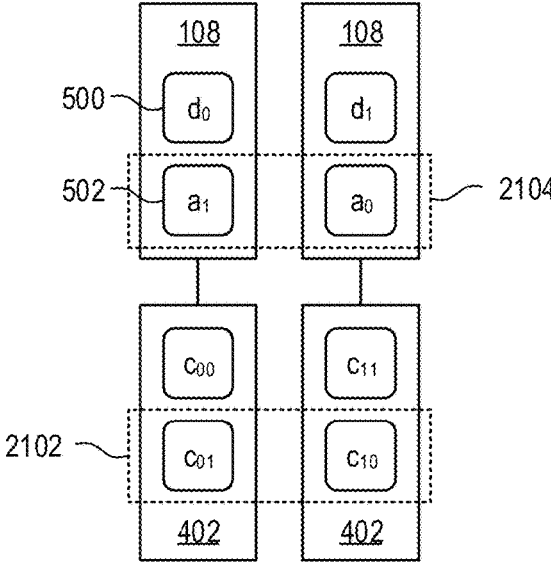
FIG. 21B $$\begin{bmatrix} d_0 \\ d_1 \end{bmatrix} = \begin{bmatrix} c_{00} & c_{01} \\ c_{10} & c_{11} \end{bmatrix}^T \begin{bmatrix} a_0 \\ a_1 \end{bmatrix}$$
FIG. 22A
$$\begin{bmatrix} d_0 \\ d_1 \end{bmatrix} = \begin{bmatrix} c_{00} & c_{10} \\ c_{01} & c_{11} \end{bmatrix} \begin{bmatrix} a_0 \\ a_1 \end{bmatrix}$$
FIG. 22B
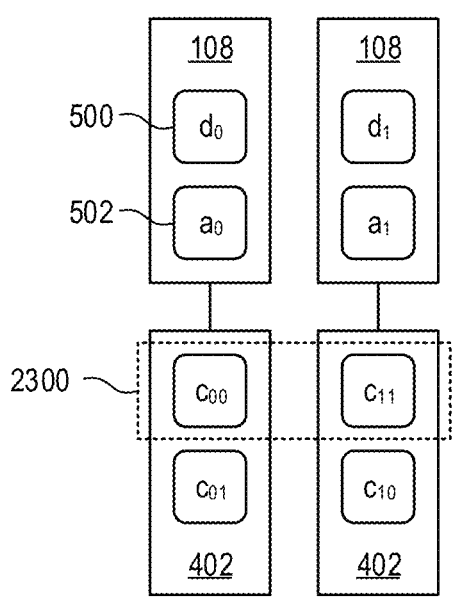
FIG. 23A
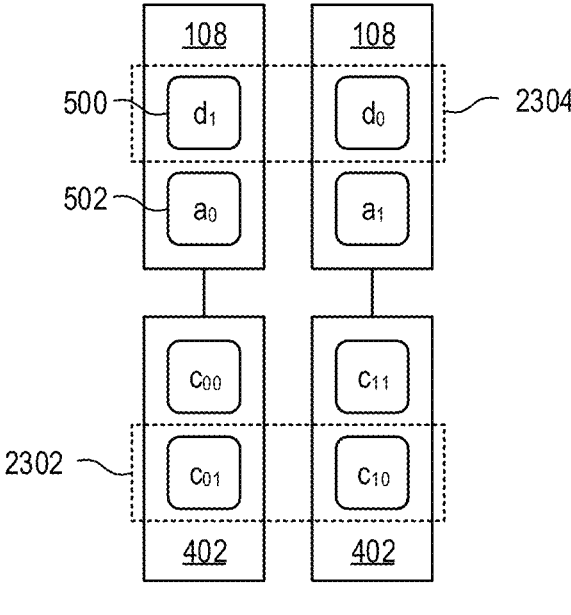
FIG. 23B

$$\begin{bmatrix} d_0 \\ d_1 \end{bmatrix} = \begin{bmatrix} c_{00} & c_{01} & c_{02} & c_{03} \\ c_{10} & c_{11} & c_{12} & c_{13} \end{bmatrix} \begin{bmatrix} a_0 \\ a_1 \\ a_2 \\ a_3 \end{bmatrix}$$

$$\begin{bmatrix} d_0 \\ d_1 \\ d_2 \\ d_3 \end{bmatrix} = \begin{bmatrix} c_{00} & c_{01} \\ c_{10} & c_{11} \\ c_{02} & c_{03} \\ c_{12} & c_{13} \end{bmatrix} \begin{bmatrix} a_0 \\ a_1 \end{bmatrix}$$

COMPUTATIONAL MEMORY

CROSS-REFERENCE TO RELATED APPLICATIONS

This application is a continuation of U.S. patent application Ser. No. 17/675,729 (filed on Feb. 18, 2022), entitled "Computational Memory", which is hereby incorporated by reference in its entirety. The aforementioned patent application is a continuation-in-part of U.S. patent application Ser. No. 16/815,535 (filed on Mar. 11, 2020), now U.S. Pat. No. 11,256,503, which is hereby incorporated by reference. This application claims priority to U.S. provisional patent application Ser. Nos. 62/816,380 (filed on Mar. 11, 2019), 62/887,925 (filed on Aug. 16, 2019), 62/904,142 (filed on Sep. 23, 2019), 62/929,233 (filed on Nov. 1, 2019), and 62/983,076 (filed on Feb. 28, 2020), all of which are incorporated herein by reference.

BACKGROUND

Deep learning has proven to be a powerful technique for performing functions that have long resisted other artificial intelligence approaches. For example, deep learning may be applied to recognition of objects in cluttered images, speech understanding and translation, medical diagnosis, gaming, and robotics. Deep learning techniques typically apply many layers (hence "deep") of neural networks that are trained (hence "learning") on the tasks of interest. Once trained, a neural network may perform "inference", that is, inferring from new input data an output consistent with what it has learned.

Neural networks, which may also be called neural nets, perform computations analogous to the operations of biological neurons, typically computing weighted sums (or dot products) and modifying the results with a memoryless nonlinearity. However, it is often the case that more general functionality, such as memory, multiplicative nonlinearities, and "pooling", are also required.

In many types of computer architecture, power consumption due to physically moving data between memory and processing elements is non-trivial and is frequently the dominant use of power. This power consumption is typically due to the energy required to charge and discharge the capacitance of wiring, which is roughly proportional to the length of the wiring and hence to distance between memory and processing elements. As such, processing a large number of computations in such architectures, as generally required for deep learning and neural networks, often requires a relatively large amount of power. In architectures that are better suited to handle deep learning and neural networks, other inefficiencies may arise, such as increased complexity, increased processing time, and larger chip area requirements.

SUMMARY

According to an aspect of this disclosure, a processing device includes a two-dimensional array of processing elements, each processing element including an arithmetic logic unit to perform an operation. The device further includes interconnections among the two-dimensional array of processing elements to provide direct communication among neighboring processing elements of the two-dimensional array of processing elements. A processing element of the two-dimensional array of processing elements is connected to a first neighbor processing element that is immediately adjacent the processing element in a first dimension of the two-dimensional array. The processing element is further connected to a second neighbor processing element that is immediately adjacent the processing element in a second dimension of the two-dimensional array.

The two-dimensional array can be a rectangular array.

The second dimension can be orthogonal to the first dimension.

The processing element can include an input selector to select input to the processing element as one of the first neighbor processing element and the second neighbor processing element.

Each of the first neighbor processing element and the second neighbor processing element can include an output selector to selectively provide output to the processing element.

The processing element can include a register to set the input selector to a selected neighbor processing element that is one of the first neighbor processing element and the second neighbor processing element to provide output to the processing element.

The processing device can further comprise a controller connected to the array of processing elements. The controller can be configured to perform a rearrangement of data within the array of processing elements by controlling communication of the data through the interconnections among the array of processing elements.

The processing device can further comprise a plurality of two-dimensional arrays of processing elements stacked to form a three-dimensional array of processing elements.

According to another aspect of this disclosure, a processing device includes a two-dimensional array of processing elements, each processing element including an arithmetic logic unit to perform an operation. The device further includes two-dimensional interconnections among the two-dimensional array of processing elements to provide direct communication among neighboring processing elements of the two-dimensional array of processing elements. A processing element of the two-dimensional array of processing elements is connected to neighbor processing elements in two dimensions via an input selector to selectively take output of the neighbor processing elements as input to the processing element.

The two-dimensional array can be a rectangular array.

Processing elements that are positioned at corners of the rectangular array can be connected to two adjacent neighbor processing elements and processing elements that are positioned at edges and not positioned at corners of the rectangular array can be connected to three adjacent neighbor processing elements.

Processing elements not positioned at edges or corners of the rectangular array can be connected to four adjacent neighbor processing elements.

The processing device can further comprise a controller configured to control the two-dimensional array of processing elements. The controller can be connected to processing elements positioned at one edge of the rectangular array.

According to another aspect of this disclosure, a non-transitory machine-readable medium includes executable instructions to load a matrix of coefficients into an array of processing elements as serialized coefficients, load an input vector into the array of processing elements, and perform a computation with the matrix of coefficients and the input vector. The computation is performed by performing a parallel operation with the serialized coefficients in the array of processing elements and the input vector, accumulating a result vector, and rotating the result vector in the array of processing elements and repeating the performing of the parallel operation and the accumulating until the computation is complete. When the computation is complete, outputting the result vector.

The matrix of coefficients can be a square submatrix of a non-square matrix. The instructions can further to divide the non-square matrix into a plurality of submatrices including the square submatrix and perform the computation with the input vector and each of the plurality of submatrices.

The instructions can further to combine each result vector of each performance of the computation for each respective submatrix of the plurality of submatrices to obtain a final result vector corresponding to the non-square matrix.

According to an aspect of this disclosure, a processing device can include a two-dimensional array of processing elements. Each processing element can include an arithmetic logic unit to perform an operation, an input selector to select input to the processing element from one of its neighboring processing elements, an output selector to select output from the processing element to a different one of its neighboring processing elements, an output selector to select output from the processing element to a different one of its neighboring processing elements, interconnections among the two-dimensional array of processing elements to provide direct communication between each processing element and its neighboring processing elements, and a controller connected to the array of processing elements.

The controller can be configured to load an input vector into the two-dimensional array of processing elements, divide a non-square matrix of coefficients into a plurality of square submatrices of coefficients, load each square submatrix of coefficients into the two-dimensional array of processing elements as serialized coefficients, and perform a computation with each loaded square submatrix of coefficients and the input vector. The computation can be performed by performing a parallel operation with the serialized coefficients in the array of processing elements and the input vector, accumulating a result vector, and rotating the result vector in the array of processing elements and repeating the performing of the parallel operation and the accumulating until the operation is complete. When the computation is complete, the result vector can be output.

The controller can be further configured to combine the result vector of each of the computations to obtain a final result vector corresponding to the non-square matrix of coefficients.

The controller can be further configured to divide the input vector into a plurality of input vector portions, each of the plurality of input vector portions corresponding to one of the plurality of square submatrices of coefficients and the controller can be further configured to perform the computation with each loaded square submatrix of coefficients and its corresponding input vector portion.

BRIEF DESCRIPTION OF THE DRAWINGS

FIG. 2 is a block diagram of an example array of processing elements.

FIG. 3 is a block diagram of an example array of processing elements with a controller.

FIG. 14 is a block diagram of an example two-dimensional array of processing elements with a controller.

FIGS. 15A to 15D are schematic diagrams of various examples of interconnections among the processing elements of FIG. 14.

FIG. 20 is an equation for an example matrix multiplication carried out by processing elements and memory cells.

FIG. 21A is a schematic diagram of an example state of processing elements and memory cells during an operation based on the equation of FIG. 20.

FIG. 21B is a schematic diagram of another example state of processing elements and memory cells during the operation based on the equation of FIG. 20.

FIG. 22A is an equation for an example transposed matrix multiplication carried out by processing elements and memory cells.

FIG. 22B is an equation showing the coefficients of the matrix of FIG. 22A transposed.

FIG. 23A is a schematic diagram of an example state of processing elements and memory cells during an operation based on the equation of FIG. 22A.

FIG. 23B is a schematic diagram of another example state of processing elements and memory cells during the operation based on the equation of FIG. 22A.

DETAILED DESCRIPTION

The techniques described herein aim to improve computational memory to handle large numbers of dot-product and neural-network computations with flexible low-precision arithmetic, provide power-efficient communications, and provide local storage and decoding of instructions and coefficients. The parallel processing described herein is suitable for neural networks, particularly where power consumption is a concern, such as in battery-powered devices, portable computers, smartphones, wearable computers, smart watches, and the like.

Figure 1:
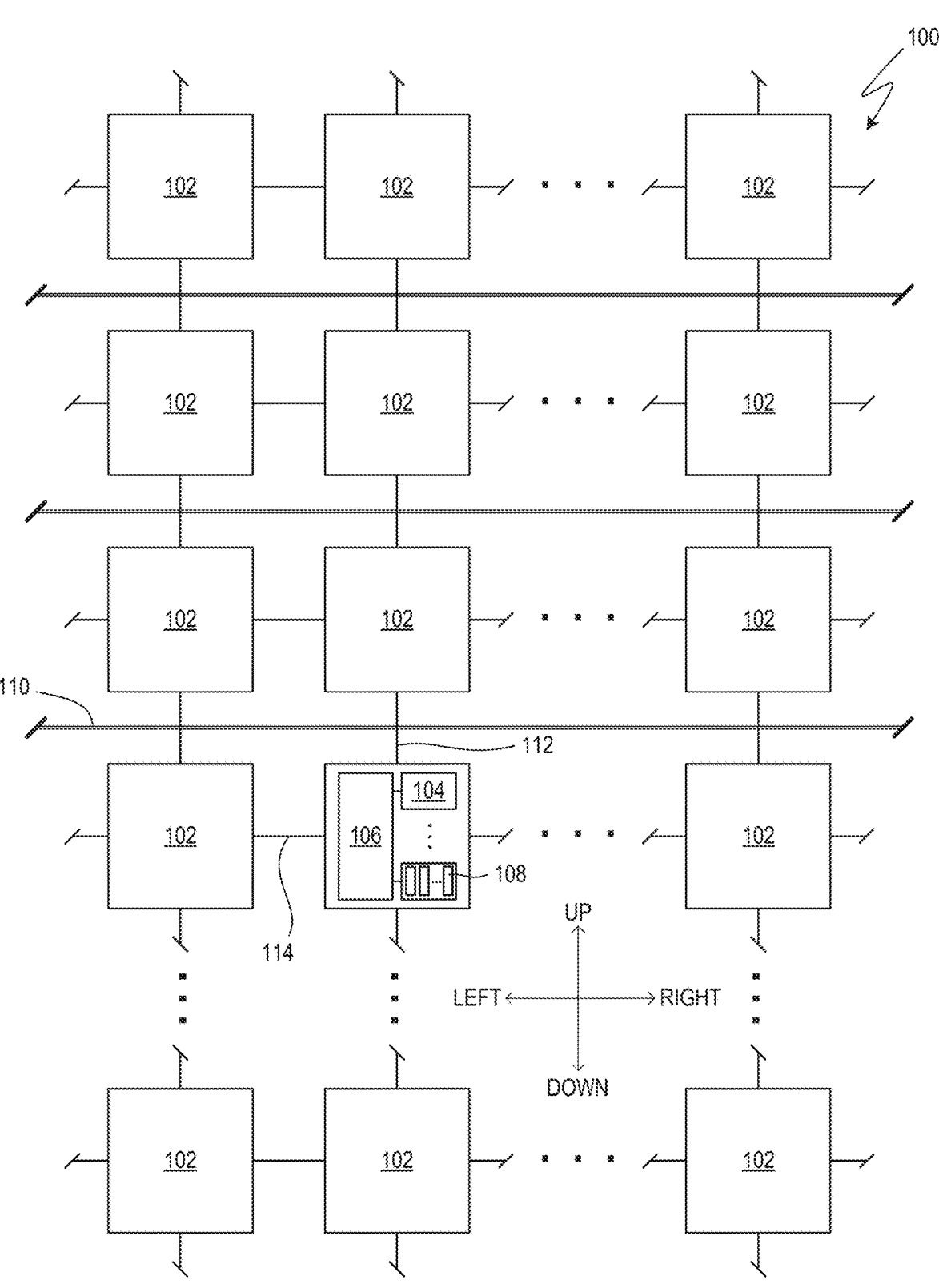
FIG. 1 is a block diagram of an example computing device that includes banks of processing elements.

FIG. 1 shows a computing device 100. The computing device 100 includes a plurality of banks 102 of processing elements. The banks 102 may be operated in a cooperative manner to implement a parallel processing scheme, such as a SIMD scheme. A bank 102 may be considered a processing device.

The banks 102 may be arranged in a regular rectangular grid-like pattern, as illustrated. For sake of explanation, relative directions mentioned herein will be referred to as up, down, vertical, left, right, horizontal, and so on. However, it is understood that such directions are approximations, are not based on any particular reference direction, and are not to be considered limiting.

Any practical number of banks 102 may be used. Limitations in semiconductor fabrication techniques may govern. In some examples, 512 banks 102 are arranged in a 32-by-16 grid.

A bank 102 may include a plurality of rows 104 of processing elements (PEs) 108 and a controller 106. A bank 102 may include any practical number of PE rows 104. For example, eight rows 104 may be provided for each controller 106. In some examples, all banks 102 may be provided with the same or similar arrangement of rows. In other examples, substantially all banks 102 are substantially identical. In still other examples, a bank 102 may be assigned a special purpose in the computing device and may have a different architecture, which may omit PE rows 104 and/or a controller 106.

Any practical number of PEs 108 may be provided to a row 104. For example, 256 PEs may be provided to each row 104. Continuing the numerical example above, 256 PEs provided to each of eight rows 104 of 512 banks 102 means the computing device 100 includes about 1.05 million PEs 108, less any losses due to imperfect semiconductor manufacturing yield.

A PE 108 may be configured to operate at any practical bit size, such as one, two, four, or eight bits. PEs may be operated in pairs to accommodate operations requiring wider bit sizes.

Instructions and/or data may be communicated to/from the banks 102 via an input/output (I/O) bus 110. The I/O bus 110 may include a plurality of segments.

A bank 102 may be connected to the I/O bus 110 by a vertical bus 112. Additionally or alternatively, a vertical bus 112 may allow communication among banks 102 in a vertical direction. Such communication may be restricted to immediately vertically adjacent banks 102 or may extend to further banks 102.

A bank 102 may be connected to a horizontally neighboring bank 102 by a horizontal bus 114 to allow communication among banks 102 in a horizontal direction. Such communication may be restricted to immediately horizontally adjacent banks 102 or may extend to further banks 102.

Communications through any or all of the busses 110, 112, 114 may include direct memory access (DMA) to memory of the rows 104 of the PEs 108. Additionally or alternatively, such communications may include memory access performed through the processing functionality of the PEs 108.

The computing device 100 may include a main processor (not shown) to communicate instructions and/or data with the banks 102 via the I/O bus 110, manage operations of the banks 102, and/or provide an I/O interface for a user, network, or other device. The I/O bus 110 may include a Peripheral Component Interconnect Express (PCIe) interface or similar.

FIG. 2 shows an example row 104 including an array of processing elements 108, which may be physically arranged in a linear pattern (e.g., a physical row). Each PE 108 includes an arithmetic logic unit (ALU) to perform an operation, such as addition, multiplication, and so on.

The PEs 108 are mutually connected to share or communicate data. For example, interconnections 200 may be provided among the array of PEs 108 to provide direct communication among neighboring PEs 108.

A PE 108 (e.g., indicated at "n") is connected to a first neighbor PE 108 (i.e., n+1) that is immediately adjacent the PE 108 (n). Likewise, the PE 108 (n) is further connected to a second neighbor PE 108 (n+2) that is immediately adjacent the first neighbor PE 108 (n+1). A plurality of PEs 108 may be connected to neighboring processing elements in the same relative manner, where n merely indicates an example PE 108 for explanatory purposes. That is, the first neighbor PE 108 (n+1) may be connected to its respective first and second neighbors (n+2 and n+3).

A given PE 108 (e.g., n+5) may also be connected to an opposite first neighbor PE 108 (n+4) that is immediately adjacent the PE 108 (n+5) on a side opposite the first neighbor PE 108 (n+6). Similarly, the PE 108 (n+5) may further be connected to an opposite second neighbor PE 108 (n+3) that is immediately adjacent the opposite first neighbor PE 108 (n+4).

Further, a PE 108 may be connected to a fourth neighbor PE 108 that is immediately adjacent a third neighbor PE 108 that is immediately adjacent the second neighbor PE 108. For example, the PE 108 designated at n may be connected to the PE designated at n+4. A connection of the PE 108 (n) to its third neighbor PE 108 (n+3) may be omitted. The fourth-neighbor connection may also be provided in the opposite direction, so that the PE 108 (n) connects to its fourth neighbor PE 108 at n−4 (not shown).

Still further, a PE 108 may be connected to a sixth neighbor PE 108 that is immediately adjacent a fifth neighbor PE 108 that is immediately adjacent the fourth neighbor PE 108. For example, the PE 108 designated at n may be connected to the PE designated at n+6. A connection of the PE 108 (n) to its fifth neighbor PE 108 (n+5) may be omitted. The sixth-neighbor connection may also be provided in the opposite direction, so that the PE 108 (*n*) connects to its sixth neighbor PE 108 at n−6 (not shown).

Again, a plurality of PEs 108 may be connected to neighboring processing elements in the above relative manner. The designation of a PE 108 as n may be considered arbitrary for non-endmost PEs 108. PEs 108 at the ends of the array may omit certain connections by virtue of the array terminating. In the example of each PE 108 being connected to its first, second, fourth, and sixth neighbor PEs 108 in both directions, the six endmost PEs 108 have differing connections.

With reference to FIG. 3, endmost PEs 108 at one end of a row 104 may have connections 300 to a controller 106. Further, endmost PEs 108 at the opposite end of the row 104 may have a reduced number of connections 302. Additionally or alternatively, end-most PEs 108 of one bank 102 may connect in the same relative manner through the controller 106 and to PEs 108 of an adjacent bank 102. That is, the controller 106 may be connected between two rows 104 of PEs 108 in adjacent banks 102, where the two rows 104 of PEs 108 are connected in the same manner as shown in FIG. 2.

Figure 4:
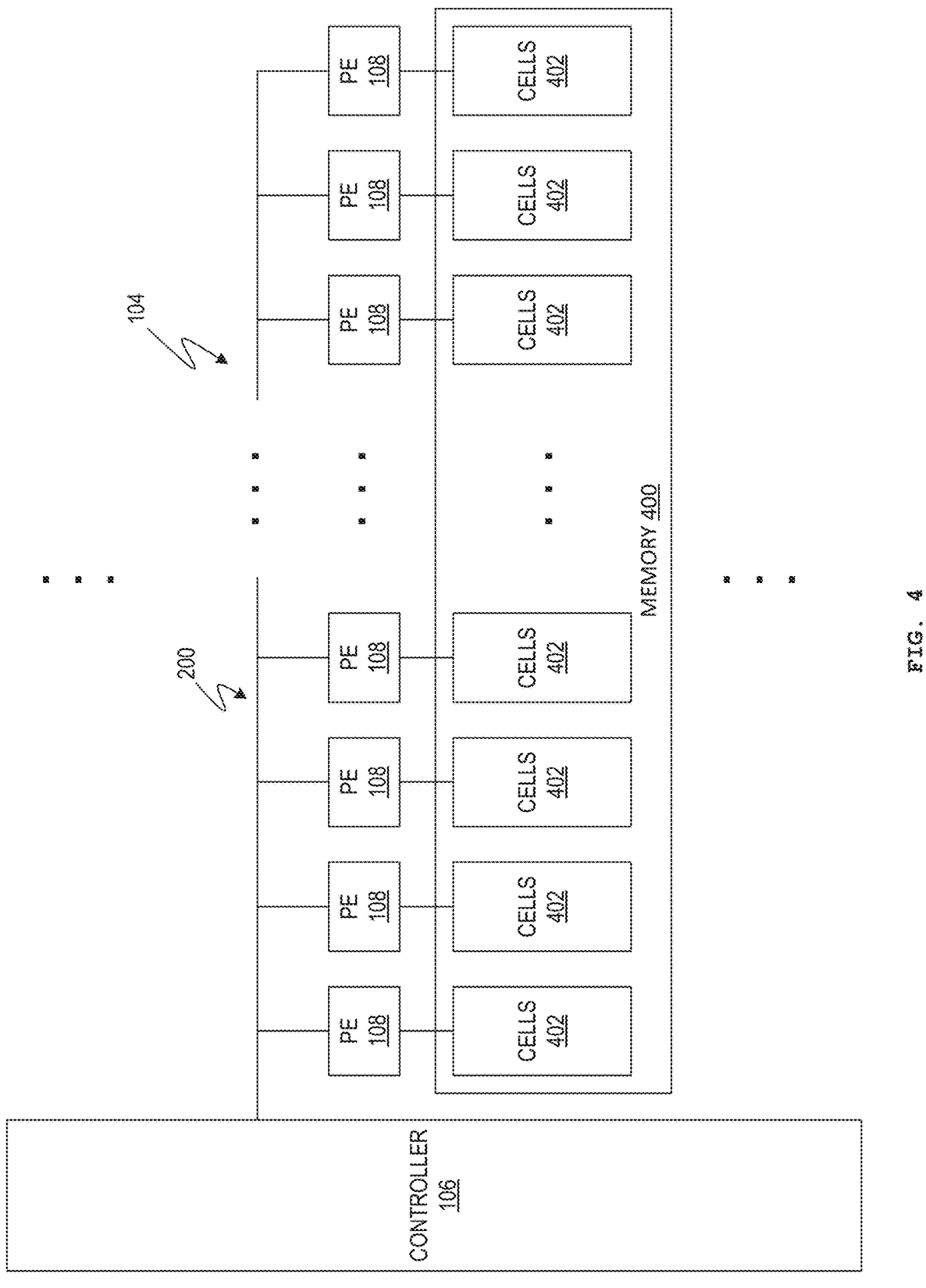
FIG. 4 is a block diagram of an example array of processing elements with a controller and memory.

With reference to FIG. 4, a row 104 of PEs 108 may include memory 400 to store data for the row 104. A PE 108 may have a dedicated space in the memory 400. For example, each PE 108 may be connected to a different range of memory cells 402. Any practical number of memory cells 402 may be used. In one example, 144 memory cells 402 are provided to each PE 108. Note that in FIG. 4 the interconnections 200 among the PEs 108 and with the controller 106 are shown schematically for sake of explanation.

The controller 106 may control the array of PEs 108 to perform a SIMD operation with data in the memory 400. For example, the controller 106 may trigger the PEs 108 to simultaneously add two numbers stored in respective cells 402.

The controller 106 may communicate data to and from the memory 400 though the PEs 108. For example, the controller 106 may load data into the memory 400 by directly loading data into connected PEs 108 and controlling PEs 108 to shift the data to PEs 108 further in the array. PEs 108 may load such data into their respective memory cells 402. For example, data destined for rightmost PEs 108 may first be loaded into leftmost PEs and then communicated rightwards by interconnections 200 before being stored in rightmost memory cells 402. Other methods of I/O with the memory, such as direct memory access by the controller 106, are also contemplated. The memory cells 402 of different PEs 108 may have the same addresses, so that address decoding may be avoided to the extent possible. In addition, the PEs 108 may be configured to receive broadcasts of data from the controller 106.

Data stored in memory cells 402 may be any suitable data, such as operands, operators, coefficients, vector components, mask data, selection data, and similar. Mask data may be used to select portions of a vector. Selection data may be used to make/break connections among neighboring PEs 108.

Further, the controller 106 may perform a rearrangement of data within the array of PEs 108 by controlling communication of data through the interconnections 200 among the array of PEs 108. A rearrangement of data may include a rotation or cycling that reduces or minimizes a number of memory accesses while increasing or maximizing operational throughput. Other examples of rearrangements of data include reversing, interleaving, and duplicating.

In other examples, a set of interconnections 200 may be provided to connect PEs 108 in up-down (column-based) connections, so that information may be shared directly between PEs 108 that are in adjacent rows. In this description, interconnections 200 and related components that are discussed with regard to left-right (row-based) connections among PEs apply in principle to up-down (column-based) connections among PEs.

The controller 106 may be configured to perform computations with data at the PEs 108, such as summations, determinations of maximums, softmax, and similar functions that are useful in implementing neural networks. For example, controller 106 may be configured to perform a computation using the content of a register in each PE 108 of a group or bank of PEs.

Various example applications may reference pixel information of digital images to, for example, perform image classification.

In another example, pooling is performed, in which a maximum or average of adjacent values is computed. Adjacent values may be adjacent in the sense of image pixels, in that a region of pixels of an image undergoes pooling.

Figures 5, 6:
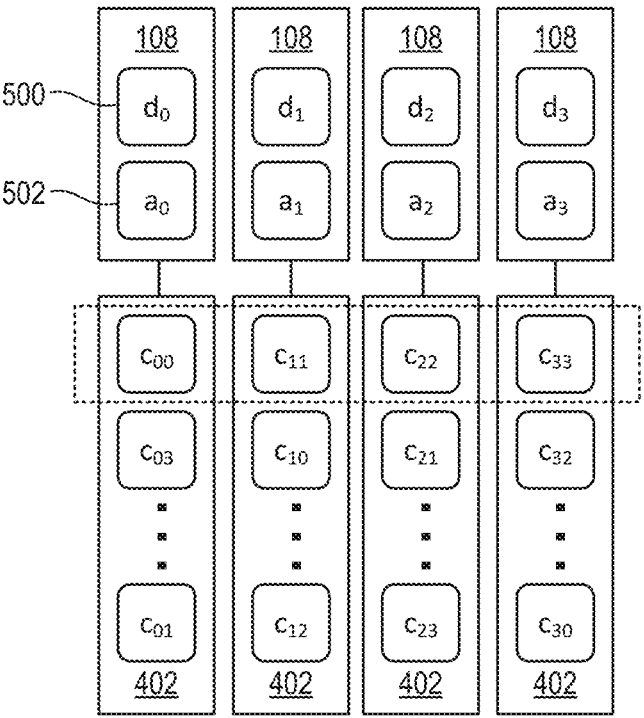
FIG. 5 is a schematic diagram of example processing elements and related memory cells.
FIG. 6 is an equation for an example matrix multiplication carried out by the processing elements and memory cells of FIG. 5.

FIG. 5 shows an array of PEs 108 and related memory cells 402. Each PE 108 may include local registers 500, 502 to hold data undergoing an operation. Memory cells 402 may also hold data contributing to the operation. For example, the PEs 108 may carry out a matrix multiplication, as shown in FIG. 6.

A matrix multiplication may be a generalized matrix-vector multiply (GEMV). A matrix multiplication may use a coefficient matrix and an input vector to obtain a resultant vector. In this example, the coefficient matrix is a four-by-four matrix and the vectors are of length four. In other examples, matrices and vectors of any practical size may be used. In other examples, a matrix multiplication may be a generalized matrix-matrix multiply (GEMM).

As matrix multiplication involves sums of products, the PEs 108 may additively accumulate resultant vector components $d_0$ to $d_3$ in respective registers 500, while input vector components $a_0$ to $a_3$ are multiplied by respective coefficients $c_{00}$ to $c_{33}$. That is, one PE 108 may accumulate a resultant vector component $d_0$, a neighbor PE 108 may accumulate another resultant vector component $d_1$, and so on. Resultant vector components $d_0$ to $d_3$ may be considered dot products. Generally, a GEMV may be considered a collection of dot products of a vector with a set of vectors represented by the rows of a matrix.

To facilitate matrix multiplication, the contents of registers 500 and/or registers 502 may be rearranged among the PEs 108. A rearrangement of resultant vector components $d_0$ to $d_3$ and/or input vector components $a_0$ to $a_3$ may use the direct interconnections among neighbor PEs 108, as discussed above. In this example, resultant vector components $d_0$ to $d_3$ remain fixed and input vector components $a_0$ to $a_3$ are moved. Further, coefficients $c_{00}$ to $c_{33}$ may be loaded into memory cells to optimize memory accesses.

In the example illustrated in FIG. 5, the input vector components $a_0$ to $a_3$ are loaded into a sequence of PEs 108 that are to accumulate resultant vector components do to $d_3$ in the same sequence. The relevant coefficients $c_{00}$, $c_{11}$, $c_{22}$, $c_{33}$ are accessed and multiplied by the respective input vector components $a_0$ to $a_3$. That is, $a_0$ and $c_{00}$ are multiplied and then accumulated as $d_0$, $a_1$ and $c_{11}$ are multiplied and then accumulated as $d_1$, and so on.

Figure 7A:
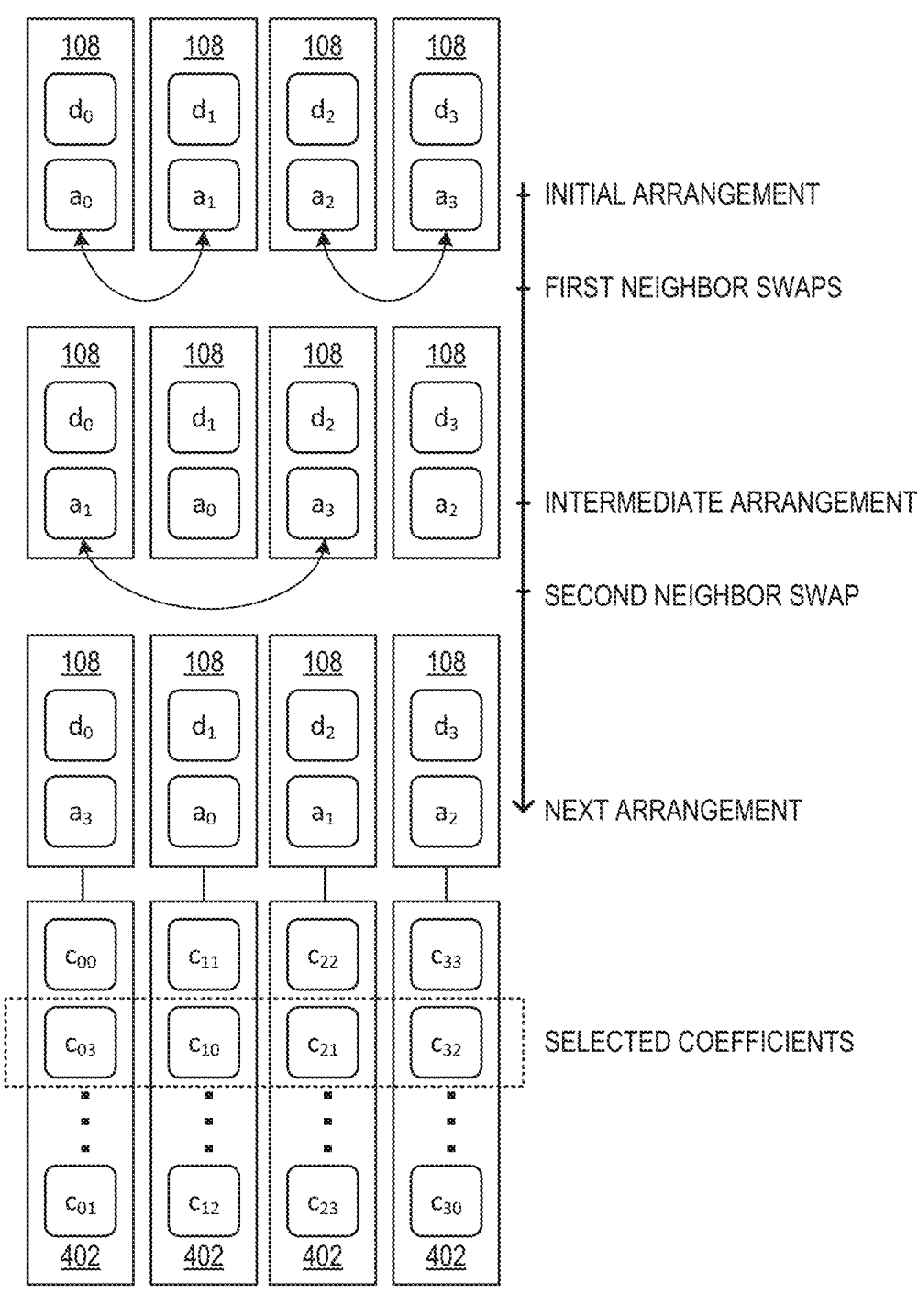
FIG. 7A is a schematic diagram of an example state sequence of the processing elements and memory cells of FIG. 5.

The input vector components $a_0$ to $a_3$ are then rearranged, as shown in the PE state sequence of FIG. 7A, so that a remaining contribution of each input vector components $a_0$ to $a_3$ to a respective resultant vector components $d_0$ to $d_3$ may be accumulated. In this example, input vector components $a_0$ to $a_2$ are moved one PE 108 to the right and input vector components $a_3$ is moved three PEs 108 to the left. With reference to the first and second neighbor connections shown in FIG. 2, this rearrangement of input vector components $a_0$ to $a_3$ may be accomplished by swapping $a_0$ with $a_1$ and simultaneously swapping $a_2$ with $a_3$, using first neighbor connections, and then by swapping $a_1$ with $a_3$ using second neighbor connections. The result is that a next arrangement of input vector components $a_3$, $a_0$, $a_1$, $a_2$ at the PEs 108 is achieved, where each input vector component is located at a PE 108 that it has not yet occupied during the present matrix multiplication.

Appropriate coefficients $c_{03}$, $c_{10}$, $c_{21}$, $c_{32}$ in memory cells 402 are then accessed and multiplied by the respective input vector components $a_3$, $a_0$, $a_1$, $a_2$. That is, $a_3$ and $c_{03}$ are multiplied and then accumulated as $d_0$, $a_0$ and $c_{10}$ are multiplied and then accumulated as $d_1$, and so on.

The input vector components $a_0$ to $a_3$ are then rearranged twice more, with multiplying accumulation being performed with the input vector components and appropriate coefficients at each new arrangement. At the conclusion of four sets of multiplying accumulation and three intervening rearrangements, the accumulated resultant vector components $d_0$ to $d_3$ represent the final result of the matrix multiplication.

Rearrangement of the input vector components $a_0$ to $a_3$ allows each input vector component to be used to the extent needed when it is located at a particular PE 108. This is different from traditional matrix multiplication where each resultant vector component is computed to finality prior to moving to the next. The present technique simultaneously accumulates all resultant vector components using sequenced arrangements of input vector components.

Further, such rearrangements of data at the PEs 108 using the PE neighbor interconnections (FIG. 2) may be optimized to reduce or minimize processing cost. The example given above of two simultaneous first neighbor swaps followed by a second neighbor swap is merely one example. Additional examples are contemplated for matrices and vectors of various dimensions.

Further, the arrangements of coefficients $c_{00}$ to $c_{33}$ in the memory cells 402 may be predetermined, so that each PE 108 may access the next coefficient needed without requiring coefficients to be moved among memory cells 402. The coefficients $c_{00}$ to $c_{33}$ may be arranged in the memory cells 402 in a diagonalized manner, such that a first row of coefficients is used for a first arrangement of input vector components, a second row of coefficients is used for a second arrangement of input vector components, and so on. Hence, the respective memory addresses referenced by the PEs 108 after a rearrangement of input vector components may be incremented or decremented identically. For example, with a first arrangement of input vector components, each PE 108 may reference its respective memory cell at address 0 for the appropriate coefficient. Likewise, with a second arrangement of input vector components, each PE 108 may reference its respective memory cell at address 1 for the appropriate coefficient, and so on.

Figure 7B:
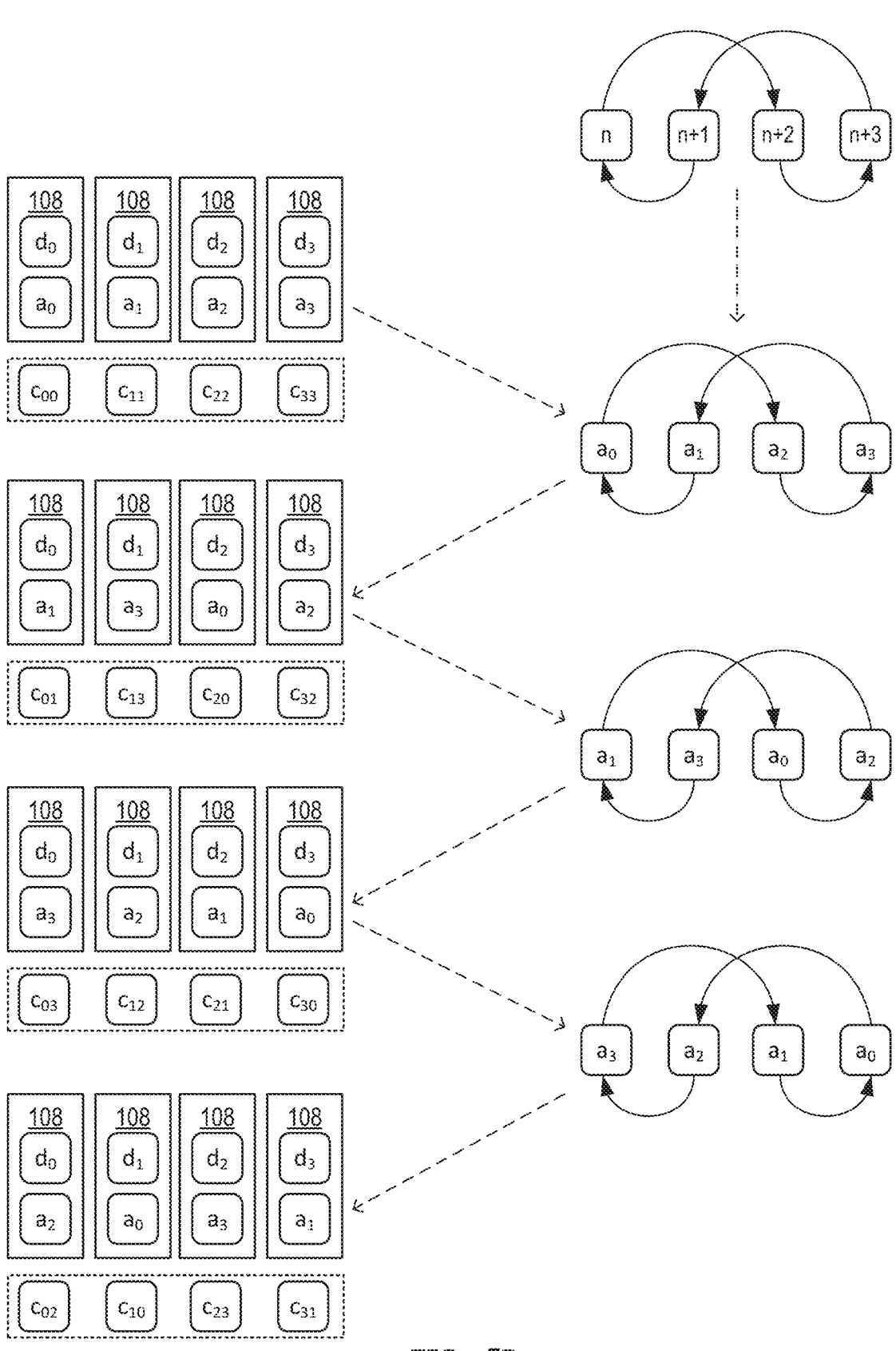
FIG. 7B is a schematic diagram of an example state sequence of the processing elements and memory cells of FIG. 5.

FIG. 7B shows another example sequence. Four states of a set of PEs 108 are shown with four sets of selected coefficients. Input vector components $a_0$ to $a_3$ are rotated so that each component $a_0$ to $a_3$ is used exactly once to contribute to the accumulation at each resultant vector component $d_0$ to $d_3$. The coefficients $c_{00}$ to $c_{33}$ are arranged so that the appropriate coefficient $c_{00}$ to $c_{33}$ is selected for each combination of input vector component $a_0$ to $a_3$ and resultant vector component $d_0$ to $d_3$. In this example, the input vector components $a_0$ to $a_3$ are subject to the same rearrangement three times to complete a full rotation. Specifically, the input vector component of an $n^{th}$ PE 108 is moved right to the second neighbor PE 108 (i.e., n+2), the input vector component of the PE 108 $n$+1 is moved left (opposite) to its first neighbor PE 108 (i.e., n) in that direction, the input vector component of the PE 108 $n$+2 is moved right to the first neighbor PE 108 (i.e., n+3), and the input vector component of the PE 108 $n$+3 is moved left to the second neighbor PE 108 (i.e., n+1).

Figure 7C:
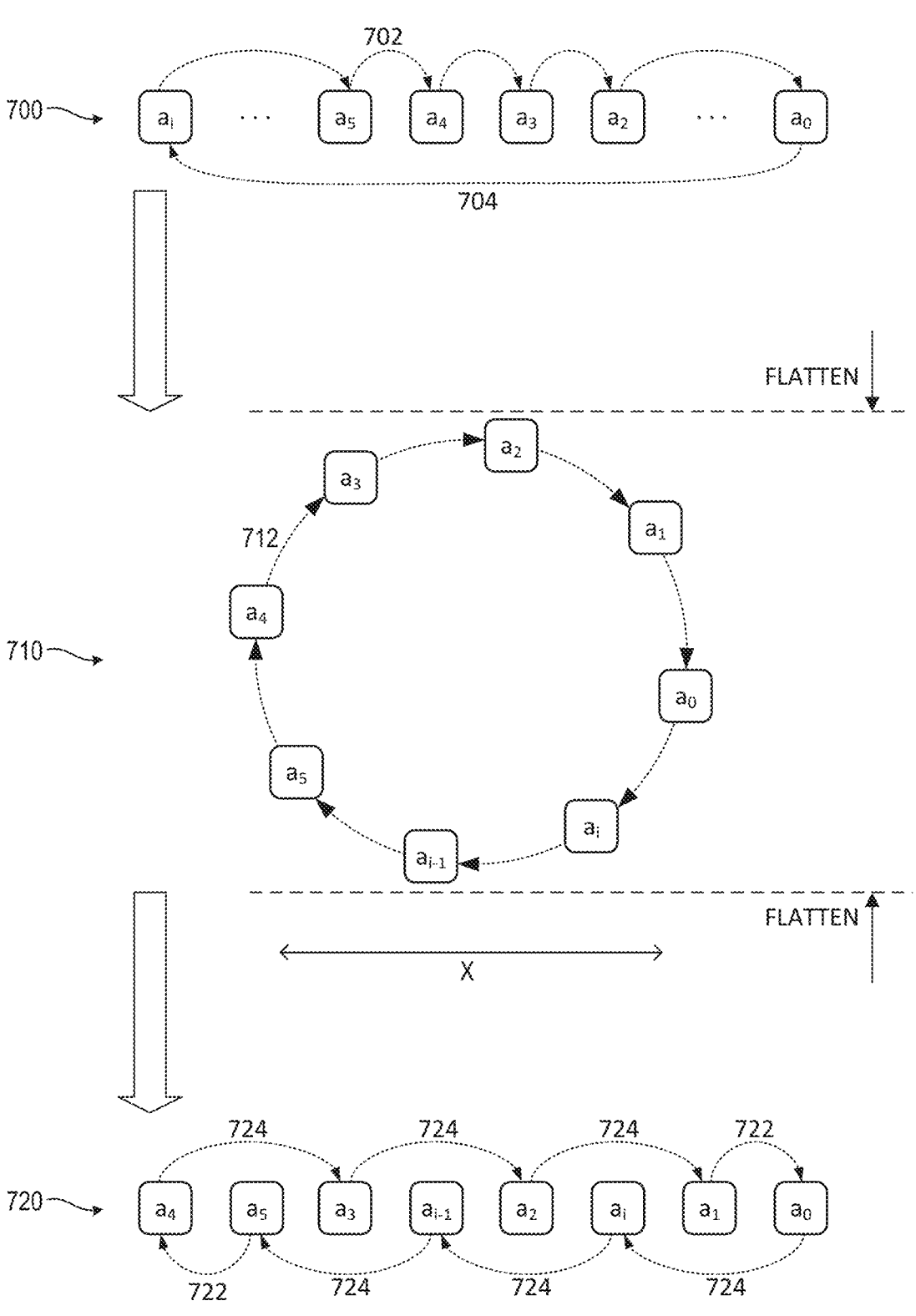
FIG. 7C is a schematic diagram of an example generalized solution to movement of input vector components among a set of processing elements.

FIG. 7C shows a generalized solution, which is implicit from the examples discussed herein, to movement of input vector components among a set of PEs 108. As shown by the row-like arrangement 700 of input vector components $a_0$ to $a_i$, which may be held by a row 104 of PEs 108, rotating information may require many short paths 702, between adjacent components $a_0$ to $a_i$, and a long path 704 between end-most components $a_i$ and $a_0$. The short paths are not a concern. However, the long path 704 may increase latency and consume additional electrical power because charging and charging a conductive trace takes time and is not lossless. The longer the trace, the greater the time/loss. The efficiency of a row 104 of PEs 108 is limited by its long path 704, in that power is lost and other PEs 108 may need to wait while data is communicated over the long path 704.

As shown at 710, a circular arrangement of PEs 108 may avoid a long path 704. All paths 712 may be segments of a circle and may be made the same length. A circular arrangement 710 of PEs 108 may be considered an ideal case. However, a circular arrangement 710 is impractical for manufacturing purposes.

Accordingly, the circular arrangement 720 may be rotated slightly and flattened (or squashed), while preserving the connections afforded by circular segment paths 712 and the relative horizontal (X) positions of the PEs, to provide for an efficient arrangement 720, in which paths 722, 724 connect adjacent PEs or skip one intermediate PE. As such, PEs 108 may be connected by a set of first-neighbor paths 722 (e.g., two end-arriving paths) and a set of second neighbor paths 724 (e.g., four intermediate and two end-leaving paths) that are analogous to circular segment paths 712 of a circular arrangement 710. The paths 722, 724 have much lower variance than the short and long paths 702, 704, so power may be saved and latency reduced. Hence, the arrangement 720 represents a readily manufacturable implementation of an ideal circular arrangement of PEs 108.

Figure 7D:
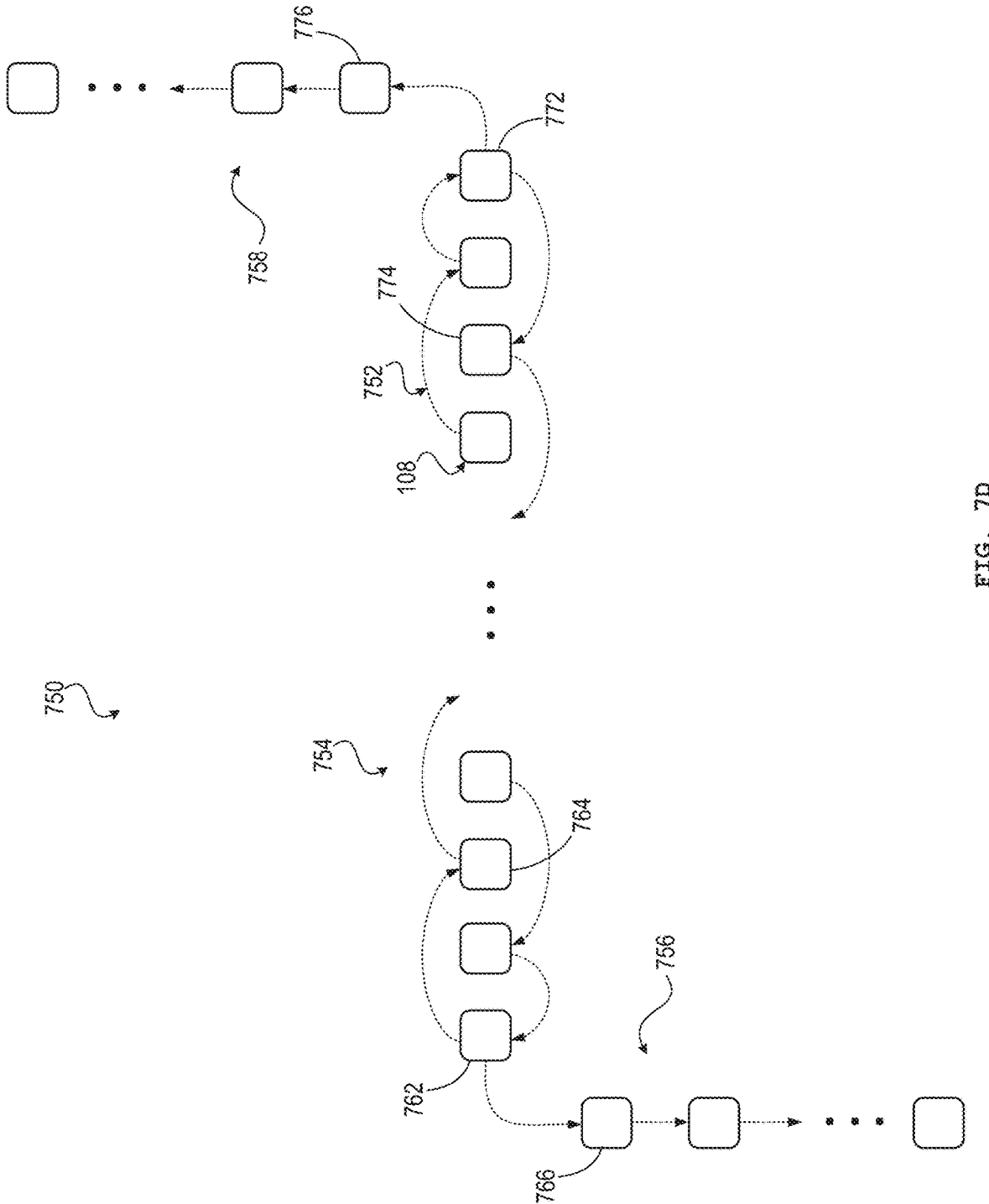
FIG. 7D is a schematic diagram of an example interconnected set of processing elements to facilitate movement of data, particularly for computations involving non-square matrices.

FIG. 7D shows an example interconnected set 750 of PEs 108, which is implicit from the examples discussed herein, to facilitate movement of data among PEs 108, so that a computation may be performed efficiently. The interconnected set 750 of PEs 108 is created by activating interconnections among PEs 108, as discussed elsewhere herein. Data may thus be communicated, via PE-to-PE connections 752, in the direction of the dashed arrows shown.

The interconnected set 750 of PEs 108 includes a flattened loop 754 and at least one tail 756, 758, with two being an example.

The flattened loop 754 is similar to the arrangement 720 discussed above. A first-end PE 762 can provide data to both the next PE 764 in the flattened loop 754 and a first PE 766 of the first tail 756. Similarly, a second-end PE 772 can provide data to both its next PE 774 in the flattened loop 754 and a first PE 776 of the second tail 758. The multiple outputs of the loop-end PEs 762, 772 may be facilitated by the listening functionality discussed elsewhere herein. That is, the loop PE 764 and tail PE 766 may listen to the same first-end PE 762, and the other loop PE 774 and other tail PE 776 may listen to the same second-end PE 772.

The tail 756, 758 is formed by connecting PEs 108 in a sequence that does not loop.

The interconnected set 750 of PEs 108 may be useful for computations with non-square matrices. A tail 756, 758 can be used to accommodate residual elements of data when a number of results and a number of inputs of a matrix are not the same or are a simple multiple or fraction.

For example, a matrix with 51 inputs (e.g., activations, input vector components, or "a") and 64 outputs (resultant vector components or "d") can be handled by setting PE 108 interconnections to create a flattened loop 754 of 51 PEs and a tail 756, 758 of 13 PEs (64–51=13). When the tail 756, 758 is filled with the correct activations, a matrix multiplication can be performed with a GEMV of 51. Each PE 108 will see each of the 51 activations. A tail of 13 PEs 108 can be split into two tails 756, 758 that total to 13 PEs, such as a first tail 756 of 7 PEs 108 and a second tail 758 of 6 PEs 108. To fill the tails 756, 758, a number of rotations equal to the length of the longest tail 756 is performed before GEMV is started. As such, computations involving non-square matrices may be performed efficiently.

Figure 8:
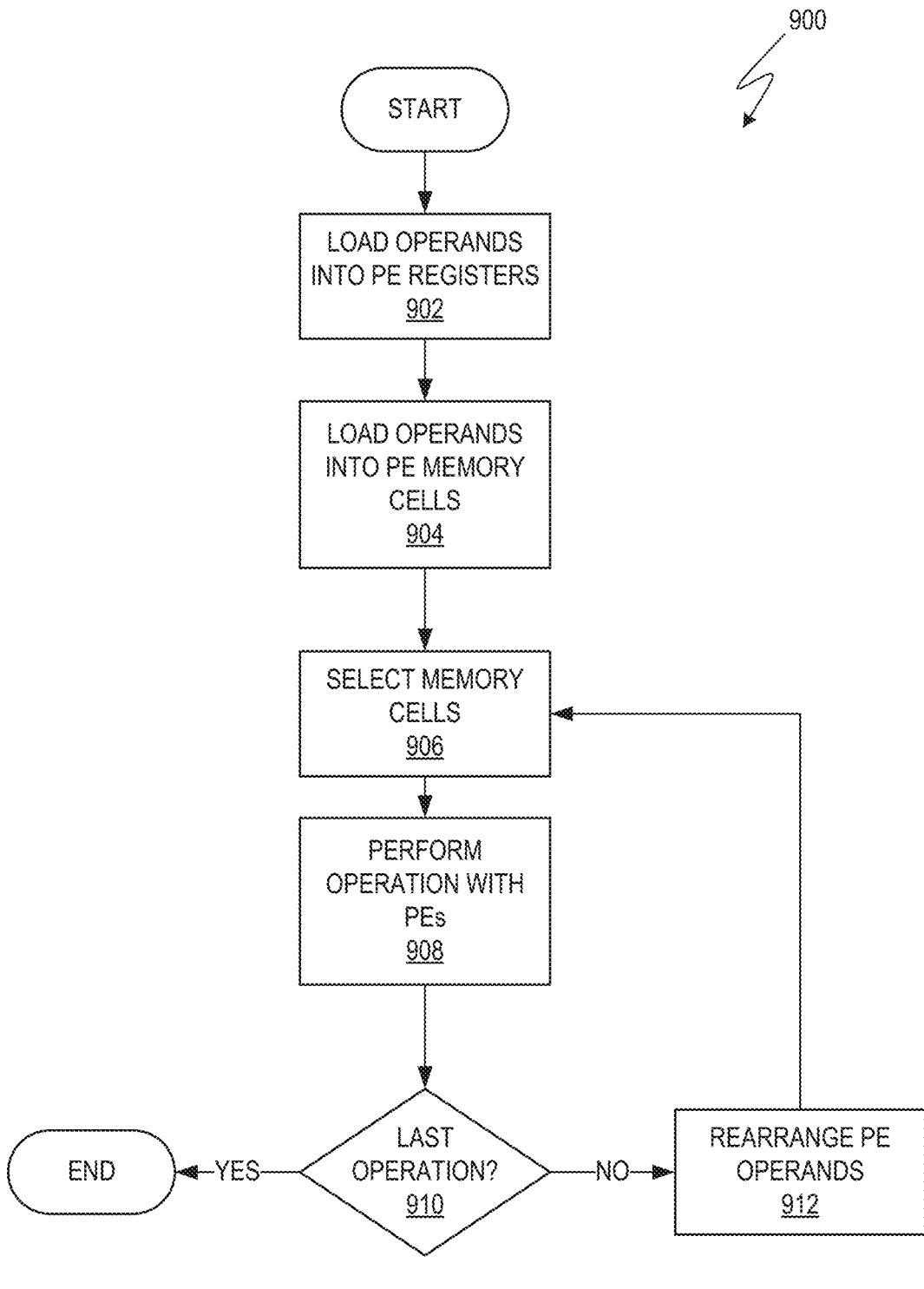
FIG. 8 is a flowchart of an example method of performing operations using processing elements and memory cells.

FIG. 8 shows a method 900 that generalizes the above example. The method 900 may be performed with the computing device 100 or a similar device. The method may be implemented by a non-transitory machine-readable medium, such as random-access memory (RAM) or electrically erasable programmable read-only memory (EE-PROM), that includes executable instructions.

At block 902, operands (e.g., input vector components) are loaded into PE registers. The operands to be loaded into PE registers may be distinguished from operands to be loaded into PE memory cells, in that there may be fewer PE registers than PE memory cells. Hence, in the example of a matrix multiplication, it may be more efficient to load the smaller matrix/vector to the into PE registers and load the larger matrix into the PE memory cells. In other applications, other preferences may apply.

At block 904, operands (e.g., matrix coefficients) are loaded into PE memory cells. The arrangement of operands may be predetermined with the constraint that moving operands is to be avoided where practical. An operand may be duplicated at several cells to avoid moving an operand between such cells.

At block 906, a set of memory cells may be selected for use in an operation. The set may be a row of memory cells. For example, a subset of coefficients of a matrix to be multiplied may be selected, one coefficient per PE.

At block 908, the same operation is performed by the PEs on the contents of the selected memory cells and respective PE registers. The operation may be performed substantially simultaneously with all relevant PEs. All relevant PEs may be all PEs of a device or a subset of PEs assigned to perform the operation. An example operation is a multiplication (e.g., multiplying PE register content with memory cell content) and accumulation (e.g., accumulating the resulting product with a running total from a previous operation).

Then, if a subsequent operation is to be performed, via block 910, operands in the PE registers may be rearranged, at block 912, to obtain a next arrangement. A next set of memory cells is then selected at block 906, and a next operation is performed at block 908. For example, a sequence of memory cells may be selected during each cycle and operands in the PE registers may be rearranged to correspond to the sequence of memory cells, so as to perform a matrix multiplication. In other examples, other operations may be performed.

Hence, a sequence or cycle or operations may be performed on the content of selected memory cells using the content of PE registers that may be rearranged as needed. The method 900 ends after the last operation, via block 910.

The method 900 may be varied. In various examples, selection of the memory cells need not be made by selection of a contiguous row. Arranging data in the memory cells according to rows may simplify the selection process. For example, a single PE-relative memory address may be referenced (e.g., all PEs refer to their local memory cell with the same given address). That said, it is not strictly necessary to arrange the data in rows. In addition or alternatively, a new set of memory cells need not be selected for each operation. The same set may be used in two or more consecutive cycles. Further, overlapping sets may be used, in that a memory cell used in a former operation may be deselected and a previously unselected memory cell may be selected for a next operation, while another memory cell may remain selected for both operations. In addition or alternatively, the operands in the PE registers need not be rearranged each cycle. Operands may remain in the same arrangement for two or more consecutive cycles. Further, operand rearrangement does not require each operand to change location, in that a given operand may be moved while another operand may remain in place.

Figure 9:
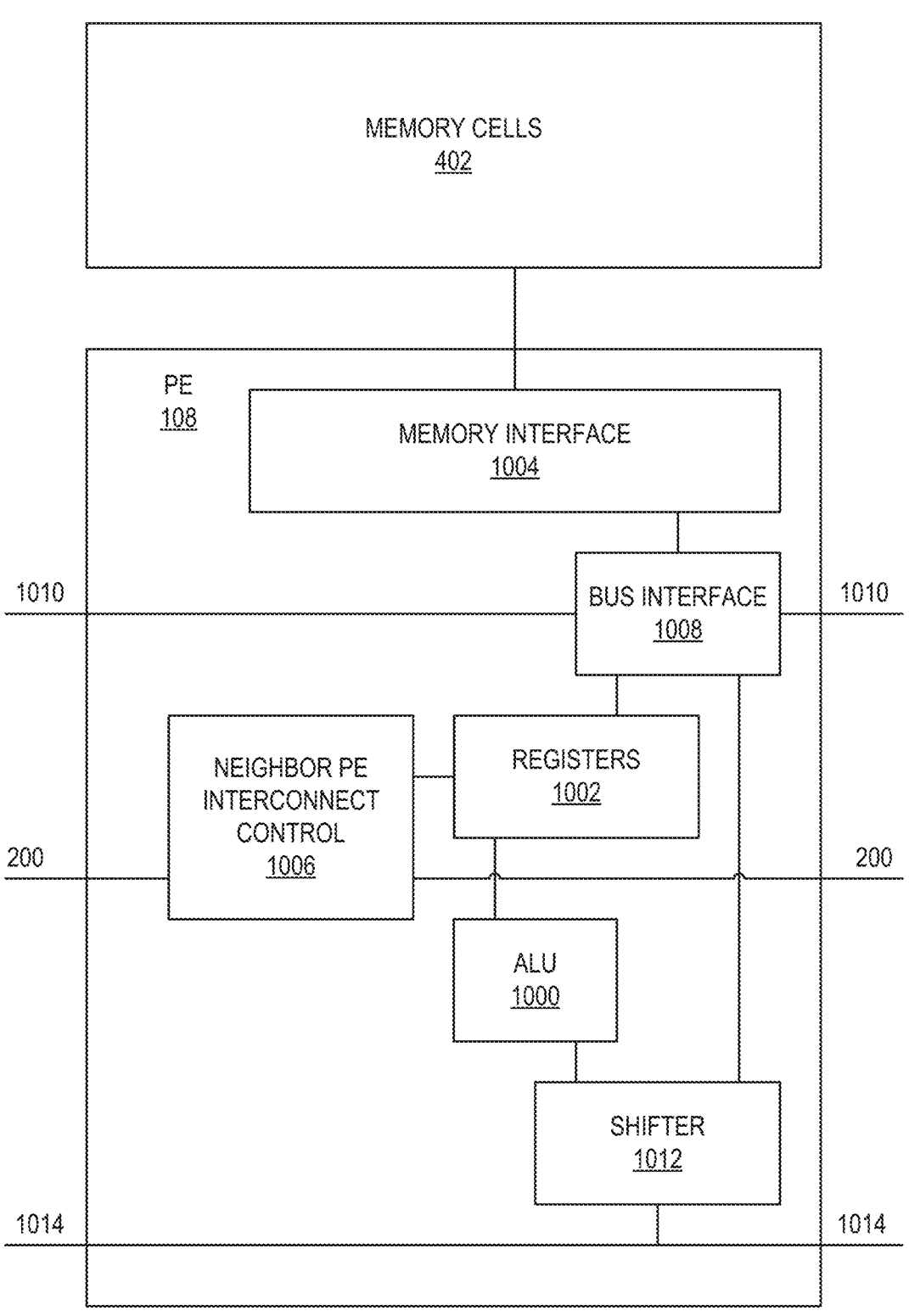
FIG. 9 is a block diagram of an example processing element and related memory cells.

FIG. 9 shows an example PE 108 schematically. The PE 108 includes an ALU 1000, registers 1002, a memory interface 1004, and neighbor PE interconnect control 1006.

The ALU 1000 performs the operational function of the PE. The ALU 1000 may include an adder, multiplier, accumulator, or similar. In various examples, the ALU 1000 is a multiplying accumulator. The ALU 1000 may be connected to the memory interface 1004, directly or indirectly, through the registers 1002 to share information with the memory cells 402. In this example, the ALU 1000 is connected to the memory interface 1004 though the registers 1002 and a bus interface 1008.

The registers 1002 are connected to the ALU 1000 and store data used by the PE 108. The registers 1002 may store operands, results, or other data related to operation of the ALU 1000, where such data may be obtained from or provided to the memory cells 402 or other PEs 108 via the neighbor PE interconnect control 1006. The registers 1002 may be termed computation registers.

The memory interface 1004 is connected to the memory cells 402 and allows for reading/writing at the memory cells 402 to communicate data with the registers 1002, ALU 1000, and/or other components of the PE 108.

The neighbor PE interconnect control 1006 connects to the registers 1002 and controls communication of data between the registers 1002 and like registers of neighboring PEs 108, for example via interconnections 200 (FIG. 2), and/or between a controller (see 106 in FIG. 3). The neighbor PE interconnect control 1006 may include a selector, such as a logic/switch array, to selectively communicate the registers 1002 to the registers 1002 of neighboring PEs 108, such as first, second, fourth, or sixth neighbor PEs. The neighbor PE interconnect control 1006 may designate a single neighbor PE 108 from which to obtain data. That is, the interconnections 200 may be restricted so that a PE 108 only at most listens to one selected neighbor PE 108. The neighbor PE interconnect control 1006 may connect PEs 108 that neighbor each other in the same row. Additionally or alternatively, a neighbor PE interconnect control 1006 may be provided to connect PEs 108 that neighbor each other in the same column.

The PE may further include a bus interface 1008 to connect the PE 108 to a bus 1010, such as a direct memory access bus. The bus interface 1008 may be positioned between the memory interface 1004 and registers 1002 and may selectively communicate data between the memory interface 1004 and either a component outside the PE 108 connected to the bus 1010 (e.g., a main processor via direct memory access) or the registers 1002. The bus interface 1008 may control whether the memory 402 is connected to the registers 1002 or the bus 1010.

The PE may further include a shifter circuit 1012 connected to the ALU 1000 and a wide-add bus 1014 to perform shifts to facilitate performing operations in conjunction with one or more neighbor PEs 108.

Figure 10:
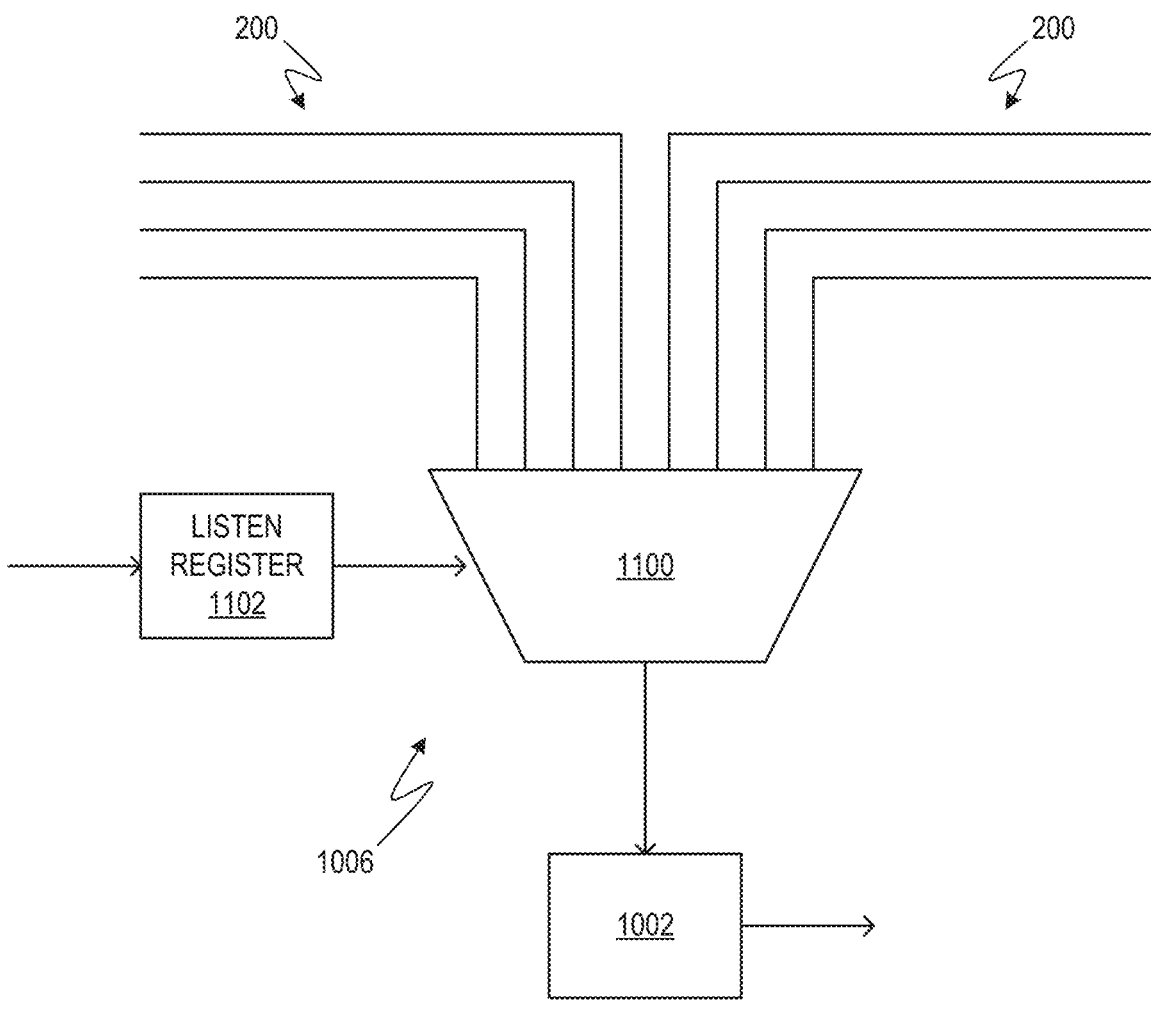
FIG. 10 is a block diagram of an example of the neighbor processing element interconnect control of FIG. 9.

FIG. 10 shows an example of the neighbor PE interconnect control 1006. The neighbor PE interconnect control 1006 includes a multiplexer 1100 and a listen register 1102 to act as a selector to provide input to the PE 108.

The multiplexer 1100 selectively communicates one interconnection 200 to a neighbor PE 108 to a register 1002 used for operations of the PE 108 to which the neighbor PE interconnect control 1006 belongs. Hence, a PE 108 listens to one neighbor PE 108.

The listen register 1102 controls the output of the multiplexer 1100, that is, the listen register 1102 selects a neighbor PE 108 as source of input to the PE 108. The listen register 1102 may be set by an external component, such as a controller 106 (FIG. 3), or by the PE 108 itself.

Figure 11:
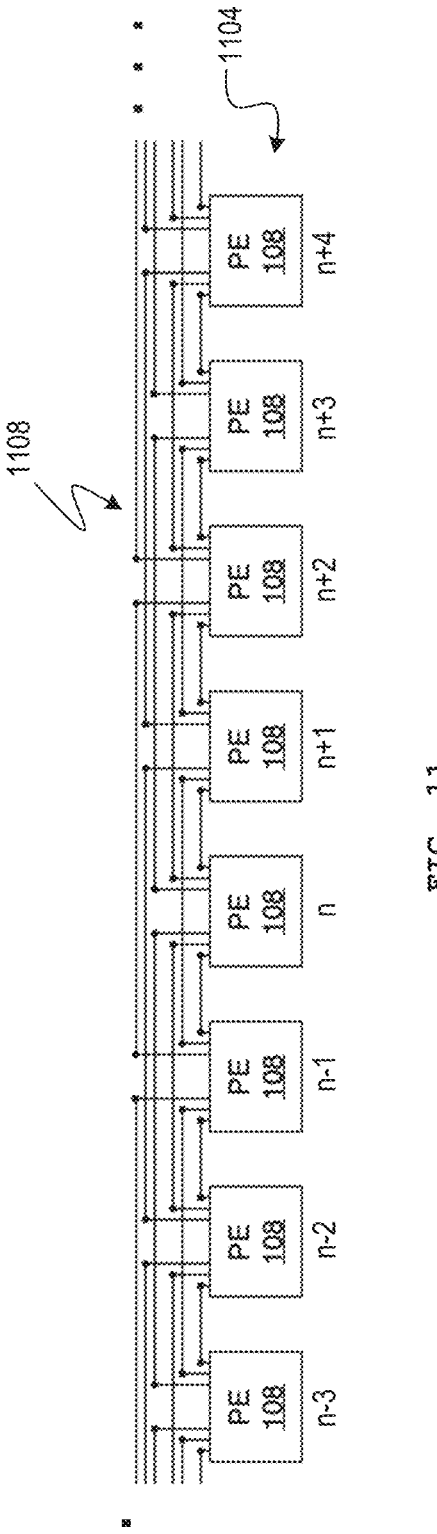
FIG. 11 is a block diagram of another example array of processing elements.

FIG. 11 shows another example row 1104 including an array of processing elements 108, which may be physically arranged in a linear pattern (e.g., a physical row). Each PE 108 includes an ALU to perform an operation, such as addition, multiplication, and so on.

The PEs 108 are mutually connected to share or communicate data. For example, interconnections 1108 may be provided among the array of PEs 108 to provide direct communication among neighboring PEs 108.

A given PE 108 (e.g., indicated at "n") is connected to a first neighbor PE 108 (i.e., n+1) that is immediately adjacent the PE 108. Likewise, the PE 108 (*n*) is further connected to a second neighbor PE 108 (n+2) that is immediately adjacent the first neighbor PE 108 (n+1) and to a third neighbor PE 108 (n+3) that is immediately adjacent the second neighbor PE 108 (n+2). The PE 108 (*n*) is also connected to opposite first (n−1), second (n−2), and third (n−3) neighbor PEs 108. Connecting each PE 108 to its first, second, and third neighbors allows for PEs 108 to communicate data locally and effectively (as discussed above) and further allows any PE 108 that may be defective or malfunctioning to be skipped.

Various PEs 108 may be connected to neighboring PEs 108 in the same relative manner. The designation of a PE 108 as "n" may be considered arbitrary for non-endmost PEs 108. PEs 108 at the ends of the array may omit certain connections by virtue of the array terminating. In the example of each PE 108 being connected to its first, second, third neighbor PEs 108 in both directions, the three endmost PEs 108 have differing connections. Endmost PEs 108 may connect to a controller.

Figure 12:
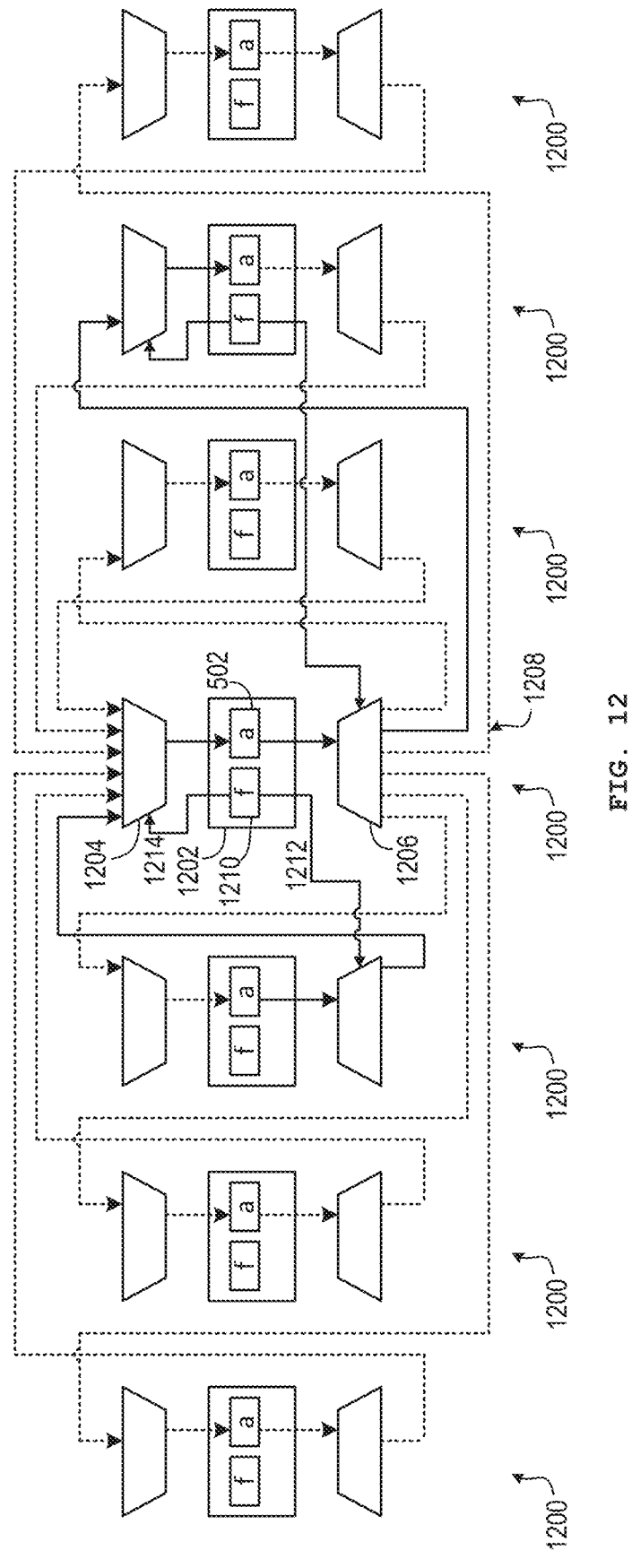
FIG. 12 is a block diagram of an example of the neighbor processing element selector.

FIG. 12 shows an array of PE units 1200 with an example neighbor PE interconnect control or selector circuit.

Each PE unit 1200 includes a PE 1202, an input selector 1204, and an output selector 1206. Memory for each PE

1200 is not shown for sake of clarity. The other PEs described herein may be referenced for detail omitted here.

For each PE unit 1200, the input selector 1204 is connected to the output selector 1206 of neighboring PE units 1200 via conductive lines 1208, such as the first, second, and third neighbor PE units 1200 in both directions. The input selector 1204 may include a multiplexer or arrangement of multiplexers. The output selector 1206 may include a logic-gate array.

For sake of clarity, not all connections are shown for all PE units 1200. The central PE unit 1200 and its connections can be taken as representative for the PE units 1200 in general. That is, each PD unit 1200 is connected to its neighbor PE units 1200 in the same manner as the central PE unit 1200 shown. In the example show, connections via conductive lines/traces shown in dashed line are inactive and those shown in solid line are active. However, it should be understood that any connection may be activated or inactivated, at various times for various reasons, as discussed herein.

Each PE 1202 includes a selector or "listen" register 1210 (also termed an "f" register) and registers 502 used for computations (also termed "a" registers for storing an input vector). The listen register 1210 of a given PE 1202 determines which neighboring PE 1202 is to be a source of data to the given PE 1202.

The listen register 1210 of the PE 1202 provides a selection input to the input selector 1204 of the PE 1202, as shown for example at 1214. The listen register 1210 can therefore select the input for the PE 1202 at the input selector 1204 from among the neighbor PEs connected to the input selector 1204. The PE 1202 may therefore "listen" to another PE 1202.

The listen register 1210 of the PE 1202 may also provide input to the output selector 1206 of neighboring PEs 1202. One such connection is shown at 1212. However, it should be understood that listen register 1210 connects to each neighboring PE's output selector 1206. The listen register 1210 controls the neighboring PE's output selector 1206 to connect to the input selector 1204. In the example shown, the central PE 1202 takes data from the PE 1202 immediately to its left, and hence the line connecting the neighboring output selector 1206 to the input selector 1204 is shown in solid line. Control of output at the output selector 1206 can save power in cases where the output of a particular PE 1202 is not being listened to by another PE 1202. The output selector 1206 can be useful in avoiding unnecessary signal transitions on conductive traces/lines connecting PEs 1202, where such signal transitions could otherwise trigger operation a multiplexer at the input selector 1204 and thereby needlessly consume power. If a signal is not listened to by another PE, then the output selector 1206 prevents output of the signal, so as to save power by avoiding unneeded triggering of logic in connected PE units 1200.

Also, shown in FIG. 12, the PE 1202 that is second from right has its listen register 1210 set such that the PE 1202 takes input from the central PE 1202, which is the second neighbor to the left.

Figure 13:
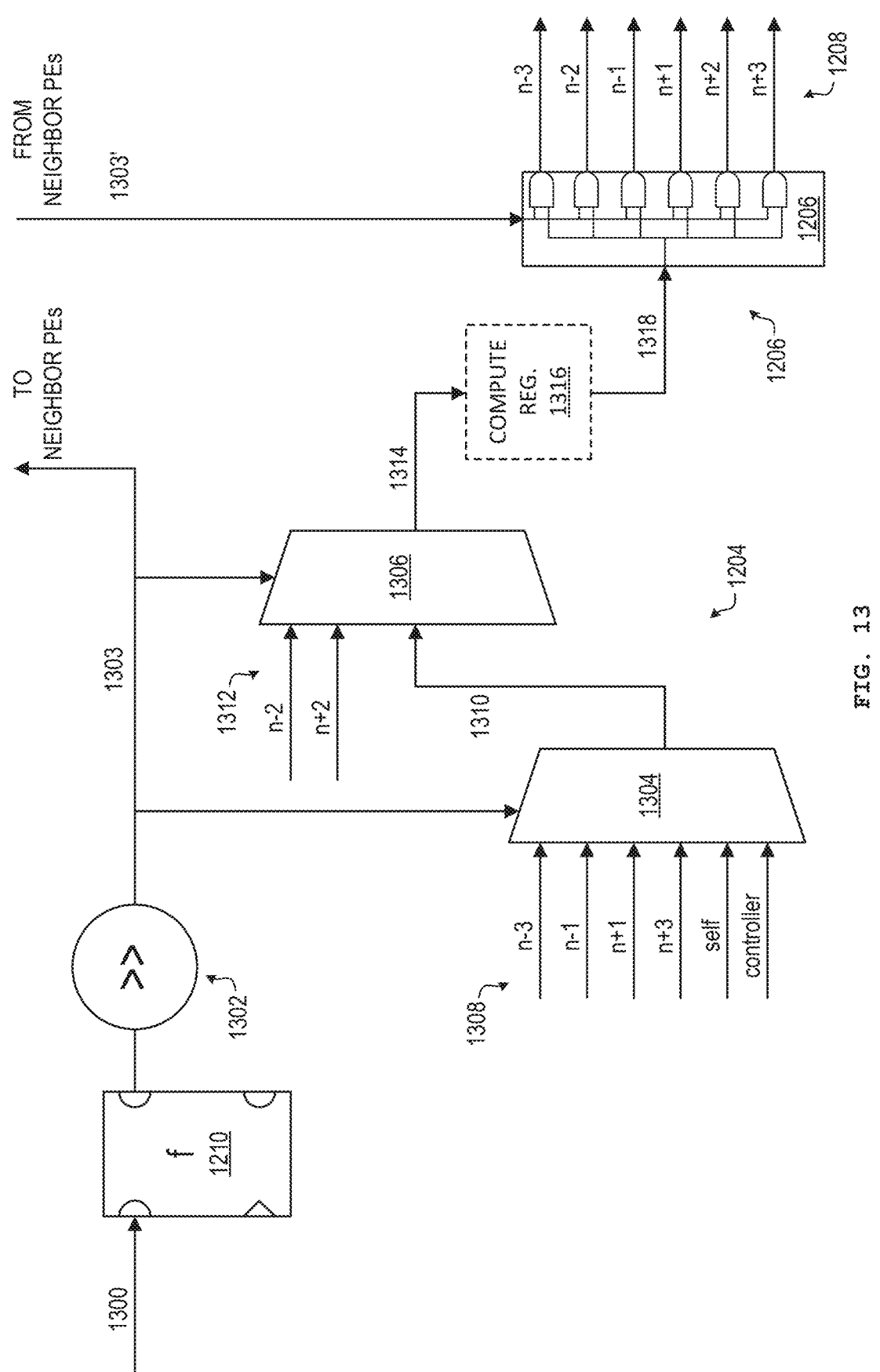
FIG. 13 is a schematic diagram of example input and output selectors.

FIG. 13 shows an example listen register 1210, input selector 1204, and output selector 1206 that may be provided to a PE, such as the PE 1202 of FIG. 12.

The listen register 1210 may include a flip-flop, latch, or similar component that takes input 1300 from a controller, such as the controller 106 of FIG. 2, or from the PE to which the listen register 1210 belongs. The input 1300 sets which neighboring PE is to provide data. When there are six possible PEs as sources of input (e.g., three adjacent in each of two directions), the input 1300 may be three bits and therefore capable of indicating at least six unique values (e.g., 0-7). The input 1300 may be controlled by instructions at a non-transitory machine-readable medium to control operation of a processing device or computing device to which the PE belongs.

A converter 1302 may be provided to convert the binary value outputted by the listen register 1210 to a one-hot output 1303. For example, output at the converter 1302 may be eight on/off lines.

The input selector 1204 may include an unbalanced multiplexer arrangement that include a first multiplexer 1304 and a second multiplexer 1306. Input 1308 to the first multiplexer 1304 may include the outputs from several neighboring PEs, such as the outputs from the first and third neighboring PEs in both directions (n−3, n−1, n+1, n+3). The output 1310 of the first multiplexer 1304 may be connected to the input of the second multiplexer 1306. The second multiplexer 1306 may also take as input 1312 the outputs from several neighboring PEs, such the second neighboring PEs in both directions (n−2, n+2). The second multiplexer 1306 may provide its output 1314 to computation registers 1316 of the PE, such as registers 500, 502, 1002, discussed elsewhere herein. For example, as is particularly relevant to the functionality provided by the listen register 1210, the input selector 1204, and the output selector 1206, the computation registers 1316 of the PE may store input vector components (activations, or "a" components). Additional computation registers 1316 may store result ("d") vector components and coefficients ("c").

Additional inputs may be provided to the unbalanced multiplexer arrangement as, for example, inputs 1308 to the first multiplexer 1304. For example, an additional input can provide the PE's own output as input to itself. A "self" or loopback input may be useful for iterative computations. Additionally or alternatively, an additional input can connect to a controller, such as the controller 106 of FIG. 3, so that the PE can receive data from the controller. This may be used to implement broadcast functionality, whereby a group of PEs are set to listen for data from the controller.

Selection inputs to the multiplexers 1304, 1306 can be appropriate lines of the one-hot signal 1303 obtained from the listen register 1210.

It has been found that communications among second neighbor PEs are more frequent than among other neighbors, such as first and third. As such, the unbalanced arrangement of multiplexer 1304, 1306 can save power due to the inputs 1312 of the downstream multiplexer 1306 being more active.

The output selector 1206 may include logic that provides output 1318 of the computation registers 1316 to a set of lines 1208 that provide output to neighboring PEs. For example, the output selector 1206 may provide AND logic for each line 1208, in which the inputs to the AND logic are the output 1318 of the computation registers 1316 and an appropriate line of a one-hot signal 1303' obtained from a neighboring PE. That is, a neighboring one-hot signal 1303' may be considered an enable signal that forwards the output 1318 of the computation registers 1316 to the selected line 1208. As such, the PE provides its one-hot signal 1303 to neighboring PEs so that it may receive corresponding neighbor signals at the arrangement of multiplexer 1304, 1306 and, at the same time, receives a one-hot signal 1303' from its neighbor PEs so that its output may be appropriately routed to the neighbor PEs requesting it.

FIG. 14 shows an example processing device 1400 with a two-dimensional (2D) array 1402 of PEs 1404 and a controller 1406. Any suitable number of PEs 1404 may form the array 1402, such as 8, 16, 32, 64, 128, etc, and such number need not be a power of two.

The PEs 1404 and controller 1406 may include features of the PEs and controllers discussed elsewhere herein. Each PE 1404 includes an ALU to perform an operation, and the controller 1406 may instruct a group of PEs 1404 or all PEs 1404 to perform the same operation in parallel.

The PEs 1404 are mutually connected by interconnections 1408, such as conductive traces or the like. The PEs 1404 may directly communicate information with adjacent PEs 1404 via the interconnection 1408. One or more of the PEs 1404 is connected to the controller 1406, so that information may be communicated between the PEs 1404 and the controller 1406. The interconnections 1408 directly connect adjacent PEs 1404 to each other and connect PEs 1404 adjacent the controller 1406 to the controller 1406. A bus, such as discussed elsewhere herein, may be provided to make other connections, such as connections between PEs/controllers of different processing devices 1400.

The 2D array 1402 has a first dimension 1410 and a second dimension 1412. Each PE 1404 of the array 1402 is connected to a first neighbor PE 1404 that is immediately adjacent the PE 1404 in the first dimension 1410. Further, each PE 1404 is connected to a second neighbor PE 1404 that is immediately adjacent the PE 1404 in the second dimension 1410.

The 2D array 1402 may be rectangular and the second dimensions 1412 may be orthogonal to the first dimension 1410. The 2D array 1402 may be a grid with PEs 1404 located at each vertex of the grid with mutual connections of adjacent PEs 1404 along the gridlines. The first dimension 1410 may define a row of PEs 1404 and the second dimension 1412 may define a column of PEs 1404 or this notation may be reversed. The sizes of the dimensions 1410, 1412 may be selected to provide any suitable arrangement of PEs 1404, such as 8 PEs in a 2-by-4 array, 16 PEs in a 4-by-4 array, 32 PEs in 4-by-8 array, 64 PEs in a 2-by-32 array, 128 PEs in a 4-by-32 array, etc.

Figures 16, 17A, 17B, 17C:
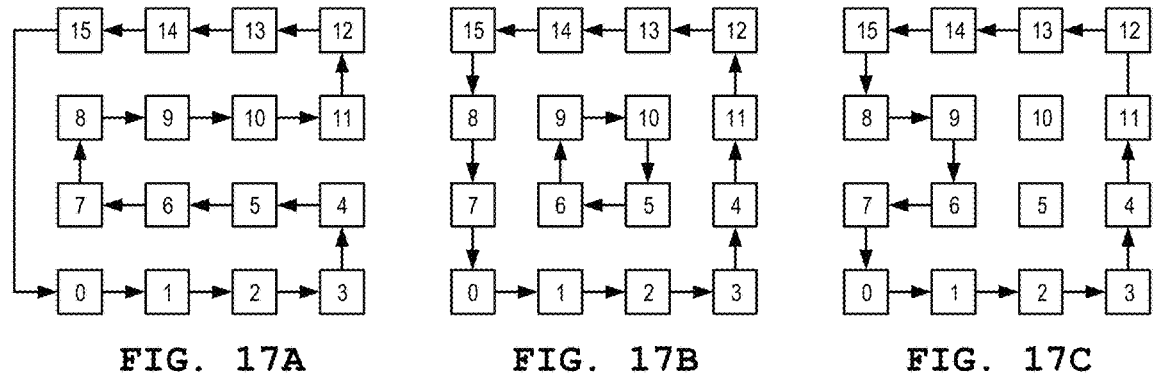
FIG. 16 is a block diagram of another example two-dimensional array of processing elements with a controller.
FIGS. 17A to 17C are schematic diagrams of various examples of interconnections among the processing elements of FIG. 16.

As can be seen in FIG. 14, PEs 1404 positioned at corners of the rectangular array may be connected to two adjacent neighbor PEs 1404. PEs 1404 positioned at edges and not positioned at corners of the rectangular array may be connected to three adjacent neighbor PEs 1404. Further, as shown in FIG. 16, PEs 1404 not positioned at edges or corners of the rectangular array may be connected to four adjacent neighbor PEs 1404. In various examples, all PEs 1404 are thus mutually interconnected to nearest neighbors. In other examples, some PEs 1404 may have interconnections that differ from the above with the majority of PEs 1404 having such mutual interconnections.

Further, the controller 1406 may be connected via interconnections 1408 to PEs 1404 positioned at one edge of the rectangular array adjacent the controller 1406.

With reference to discussion elsewhere herein, each PE 1404 includes a neighbor PE interconnect control 1006 (FIGS. 9 and 10); a listen register 1210, input selector 1204, and output selector 1206 (FIGS. 12 and 13; or similar selective connection logic to allow the PE 1404 to selectively communicate with any of its adjacent neighbor PEs 1404 or the controller 1406, as the case may be. As such, the input and output interconnections 1408 to a given PE 1404 may be driven only when necessary, i.e., when the PE 1404 is to obtain from a respective adjacent PE 1404 or the controller 1406, if situated next to the controller 1406. This may reduce power consumption by avoiding raising and lowering voltages on conductors whose signals are not presently used. Interconnections 1408 may turned on or off at any suitable time, as may be limited by the responsiveness and stability, of the processing device 1400 to allow for complex and dynamic connections among PEs 1404.

The controller 1406 may be configured to control the interconnections 1408 by, for example, turning on or off interconnections 1408 of adjacent PEs 1404 by setting listen registers at the PEs 1404. Additionally or alternatively, a PE 1404 may be configured to set its own listen register. In any case, this may allow the PEs 1404 to perform a rearrangement of data within the array 1402 as ultimately controller by the controller 1406.

FIGS. 15A to 15D show various examples of interconnections among the PEs 1404 of FIG. 14, which are numbered 0 to 7 for convenience. Such connections may facilitate the rotation of data, such as input vectors, result vectors, and/or coefficients, among the PEs. FIGS. 15A to 15D show, respectively, circuits of eight, six, four, and two PEs.

FIG. 16 shows an example processing device 1600 with a 2D array 1602 of PEs 1404 and a controller 1406. In this example, the array 1602 is a 4-by-4 rectangular array, although this size is merely illustrative. FIGS. 17A to 17C show that various rotation paths may be configured by selective control of the 2D interconnections 1408 among adjacent PEs. FIGS. 17A to 17C show examples of circuits that include 16, 12 and 4, and 14 PEs, respectively. Note that the controller 1406 may shunt data between connected PEs, as shown in FIG. 17A with the PE numbered 15 connected to the PE numbered 0. Further, PEs may be interconnected into independent circuits, as shown in FIG. 17B. Moreover, interconnections 1408 may turned on or off at any time (contingent on stability and responsiveness), so as to realize complex dynamic connections among PEs. For example, after performing a rotation using the circuit shown in FIG. 17B, the interconnections 1408 may be changed to perform a rotation the using the different circuit shown in FIG. 17C.

Figure 18:
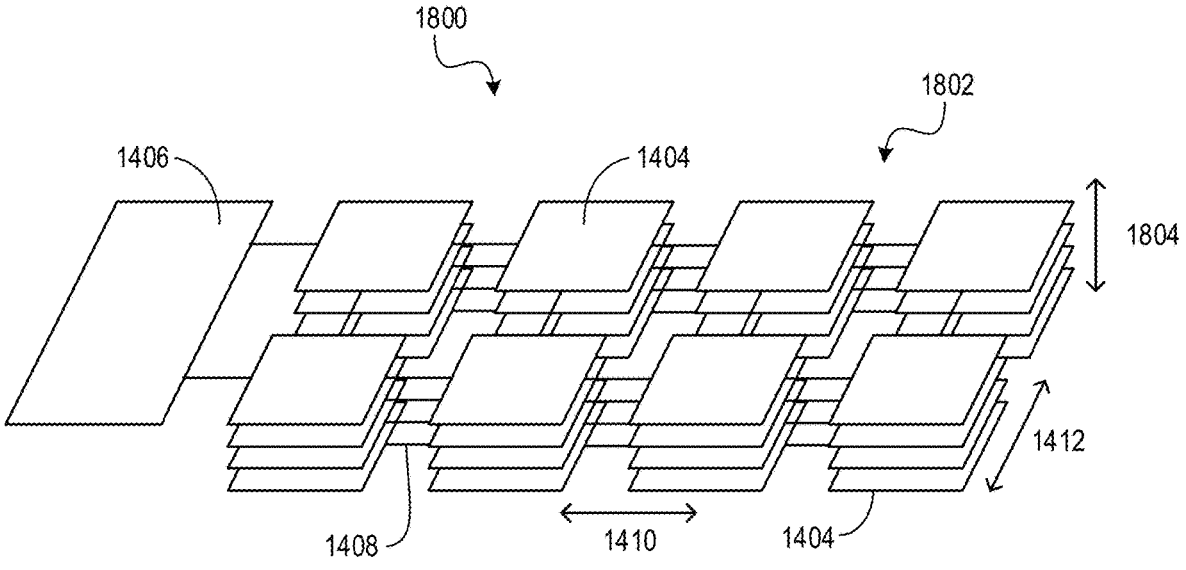
FIG. 18 is a perspective diagram of another example three-dimensional array of processing elements with a controller.

FIG. 18 shows an example processing device 1800 with a three-dimensional (3D) array 1802 of PEs 1404 and a controller 1406. In addition to the dimensions 1410, 1412, the array 1802 may include a third dimension 1804. The dimensions 1410, 1412, 1804 may be mutually orthogonal so that the array 1802 occupies a rectangular volume. In this example, one controller 1406 is provided to one layer of PEs 1404 in the third dimension 1804 and communication of data between the array 1802 and the controller 1406 is facilitate by edge-most PEs 1404 on that layer. Alternatively, each layer of PEs 1404 in the third dimension 1804 may have its own controller 1406 and the multiple controllers 1406 may be connected to each other for communication.

Figure 19:
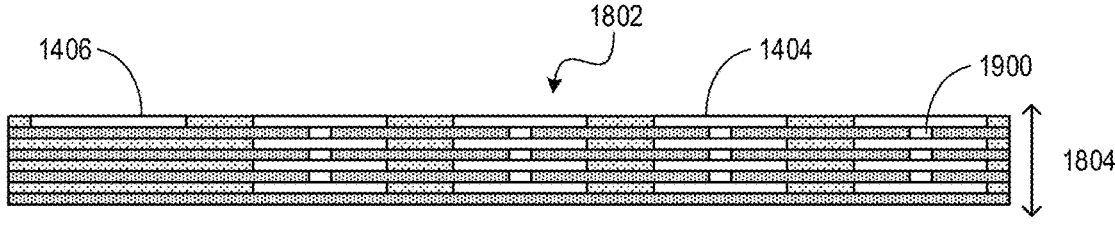
FIG. 19 is a side cross section view of the device of FIG. 18.

As shown in FIG. 19, the 3D array 1802 may be achieved by wafer stacking, which may also be referred to as wafer-on-wafer stacking or chip stacking. The PEs 1404 and controller(s) 1406 may be formed on silicon wafers and the wafers may then be stacked to provide the third dimension 1804. Vias 1900 may be used to connect PEs 1404 in the third dimension 1804.

FIGS. 20, 21A, and 21B show an example of a matrix multiplication consistent with the teachings provided above with regard to FIGS. 5, 6, and 7. As discussed above, rearrangement of resultant vector components and/or input vector components may use the direct interconnections among neighbor PEs 108. The example provided in FIGS. 20, 21A, and 21B rearranges input vector components and may use any of the PEs and respective interconnections discussed herein.

As shown in FIG. 21A, registers 500 of respective PEs 108 store respective resultant vector components $d_0$, $d_1$.

Other registers 502 of respective PEs 108 store respective input vector components $a_0$, $a_1$. Coefficients $c_{00}$, $c_{01}$ are stored in memory cells 402 connected to the PE 108 that stores resultant vector component $d_0$ and input vector component $a_0$. Similarly, coefficients $c_{11}$, $c_{10}$ are stored in memory cells 402 connected to the PE 108 that stores resultant vector component $d_1$ and input vector component $a_1$. The components $d_0$, $d_1$, $a_0$, $a_1$ and coefficients $c_{00}$ to $c_{11}$ may be arranged in a manner like this to reduce the need to move such within memory 402 and between the PEs 108 during a series of operations.

With reference to FIG. 21A, a first step loads coefficients $c_{00}$, $c_{11}$ from the memory cells 402, as indicated a 2100 to perform respective multiplications. Input component $a_0$ is multiplied by coefficient $c_{00}$ and the result stored as result component $d_0$. Similarly, at the other PE 108, input $a_1$ is multiplied by coefficient $c_{11}$ and the result is stored as result component $d_1$. Then, with reference to FIG. 21B, a second step loads coefficients $c_{01}$, $c_{10}$ from the memory cells 402, as indicated a 2102. In addition, the PEs 108 swap input vector components $a_0$, $a_1$, indicated at 2104, using the rotational techniques discussed herein. Then, input component $a_1$ is multiplied by coefficient $c_{01}$ and the result is added (or otherwise accumulated) with the existing result component $d_0$. Similarly, at the other PE 108, input $a_0$ is multiplied by coefficient $c_{10}$ and the result is added (or otherwise accumulated) with the existing result component $d_1$. As such, the result vector d is $[a_0 c_{00} + a_1 c_{01}, a_1 c_{11} + a_0 c_{10}]$ as expected from the equation of FIG. 20.

This matrix multiplication may be carried out with any suitable dimensions of input vector and coefficient matrix. See FIGS. 5, 6, and 7 for another example.

If the coefficient matrix is first to be transposed before a sequence of operations is carried out, as is frequently done in deep learning, the coefficients $c_{11}$ to $c_{11}$ may be moved within and among the memory cells 408 to obtain a transposed representation of the coefficient matrix in the memory cells 408. Then, sequence of operations may be carried out exactly as discussed above with rotation of the input vector components $a_0$, $a_1$.

However, as discussed above with regard to FIGS. 5, 6, and 7, resultant vector components $d_0$, $d_1$ may be rotated in addition to or as an alternative to rotating input vector components $a_0$, $a_1$. As shown in FIGS. 22A, 22B, 23A, and 23B, rotation of result vector components $d_0$, $d_1$ allows for a computation that uses a transposed coefficient matrix without requiring moving the coefficients $c_{11}$ to $c_{11}$ within or among the memory cells 408 to obtain an actual transposed representation of the coefficient matrix. Hence, the memory cells 408 may store one representation of the coefficient matrix with coefficients $c_{11}$ to $c_{11}$ arranged to perform efficient operations by rotation of input vector components $a_0$, $a_1$, and that very same representation of the coefficient matrix may also be used for perform operations on the transposed coefficient matrix by simply rotating result vector components $d_0$, $d_1$ instead of rotating input vector components $a_0$, $a_1$.

FIG. 22A shows an equation defining an example transpose computation. The coefficient matrix is indicated as transposed. FIG. 22B shows the same computation, but with the coefficients $c_{11}$ to $c_{11}$ in their transposed arrangement. The computation defined by FIGS. 22A and 22B may be carried out as follows.

As shown in FIG. 23A, registers 500 of respective PEs 108 store respective resultant vector components $d_0$, $d_1$. Other registers 502 of respective PEs 108 store respective input vector components $a_0$, $a_1$. Coefficients $c_{00}$ to $c_{11}$ are stored in memory cells 402 in the same arrangement as discussed with respect to FIGS. 21A and 21B. That is, the coefficients $c_{00}$ to $c_{11}$ are not rearranged to perform the transpose operation. The state of FIG. 23A is identical to the state of FIG. 21A.

As shown in FIG. 23A, a first step loads coefficients $c_{00}$, $c_{11}$ from the memory cells 402, as indicated a 2300 to perform respective multiplications. Input component $a_0$ is multiplied by coefficient $c_{00}$ and the result stored as result component $d_0$. Similarly, at the other PE 108, input $a_1$ is multiplied by coefficient $c_{11}$ and the result is stored as result component $d_1$. Incidentally, this is the same as the step discussed with respect to FIG. 21A because, at least in this example, coefficients $c_{00}$ to $c_{11}$ are arranged so that the main diagonal of the matrix is used at this step and the main diagonal does not change when a matrix is transposed.

With reference to FIG. 23B, a second step loads coefficients $c_{01}$, $c_{10}$ from the memory cells 402, as indicated a 2302. In addition, rather than swapping input vector components $a_0$, $a_1$, the PEs 108 swap result vector components $d_0$, $d_1$, indicated at 2304, using the rotational techniques discussed herein. Then, input component $a_0$ is multiplied by coefficient $c_{01}$ and the result is added (or otherwise accumulated) with the existing result component $d_1$. Similarly, at the other PE 108, input $a_1$ is multiplied by coefficient $c_{10}$ and the result is added (or otherwise accumulated) with the existing result component $d_0$. As such, the result vector d is $[a_0c_{00}+a_1c_{10}, a_1c_{11}+a_0c_{01}]$ as expected from the equation of FIG. 22B.

Accordingly, it should be apparent that rotation of result vector components, in addition to enabling general operations discussed with respect to FIGS. 5, 6, and 7, can be used to perform a sequence of operations with a transposed matrix when the matrix is stored in an arrangement used for efficient non-transposed operations.

Figure 24:
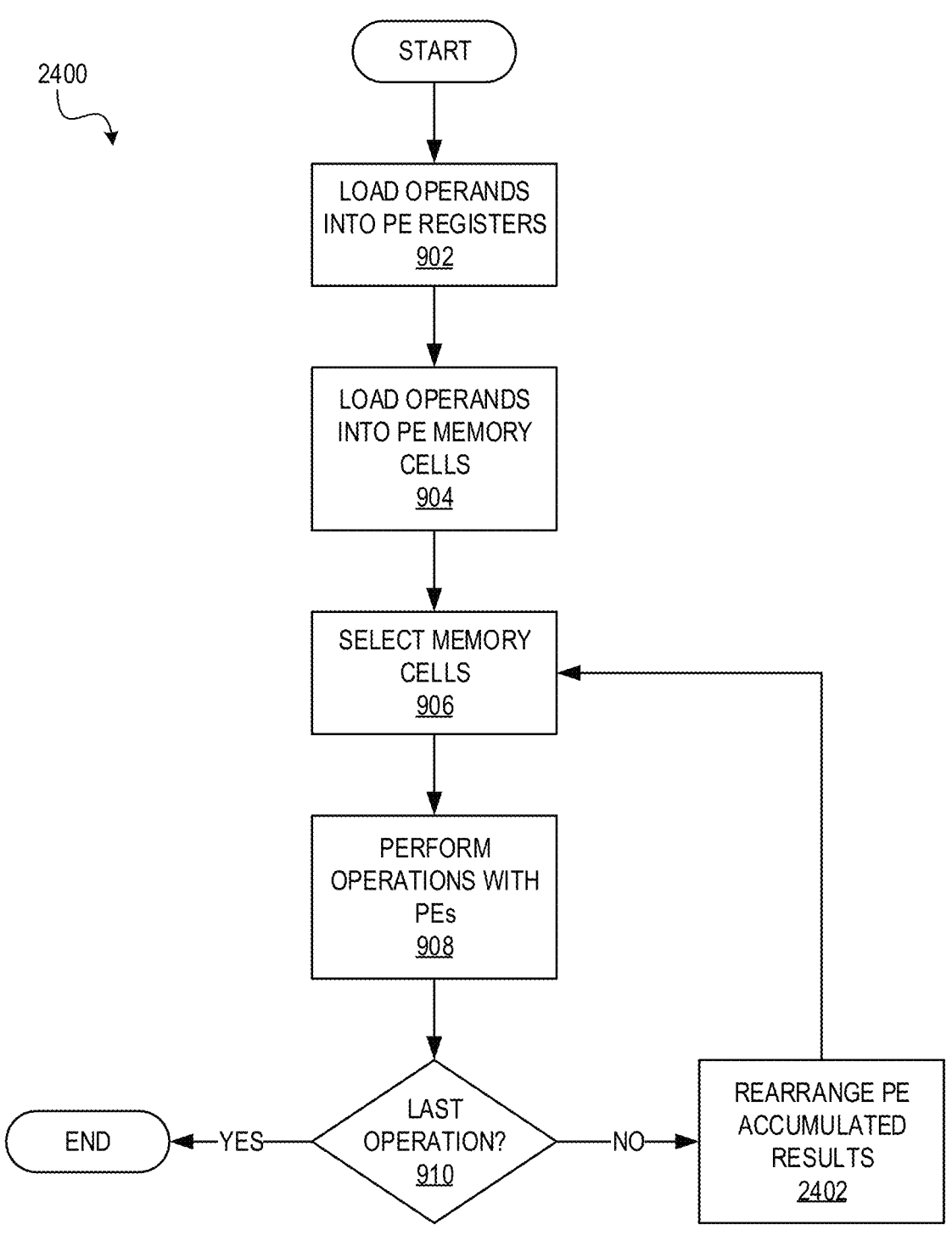
FIG. 24 is a flowchart of an example method of performing operations using processing elements and memory cells.

FIG. 24 shows a method 2400 that generalizes the above example. The method 2400 may be performed with a computing device 100 or a similar device. The method 2400 may be implemented by a non-transitory machine-readable medium, such as RAM or EEPROM, that includes executable instructions. The method 2400 is similar to the method 900 described above with respect to FIG. 8, and only differences will be discussed in detail.

At block 902, operands (e.g., input vector components) are loaded into PE registers.

At block 904, operands (e.g., matrix coefficients) are loaded into PE memory cells.

At block 906, a set of memory cells may be selected for use in an operation. The set may be a row of memory cells. For example, a subset of coefficients of a matrix to be multiplied may be selected, one coefficient per PE.

At block 908, the same operation is performed by the PEs on the contents of the selected memory cells and respective PE registers. The operation may be performed substantially simultaneously with all relevant PEs. Results may be accumulated in PE registers.

Then, if a subsequent operation is to be performed, via block 910, accumulated results in the PE registers may be rearranged, at block 2402, to obtain a next arrangement. A next set of memory cells is then selected at block 906, and a next operation is performed at block 908. For example, a sequence of memory cells may be selected during each cycle and intermediate results in the PE registers may be rearranged to correspond to the sequence of memory cells, so as to perform a matrix multiplication. In other examples, other computations may be performed.

Hence, a sequence or cycle or operations may be performed on the content of selected memory cells using the content of PE registers that may be rearranged as needed. The method 2400 ends after the last operation, via block 910.

Figures 25, 26A, 26B, 27:
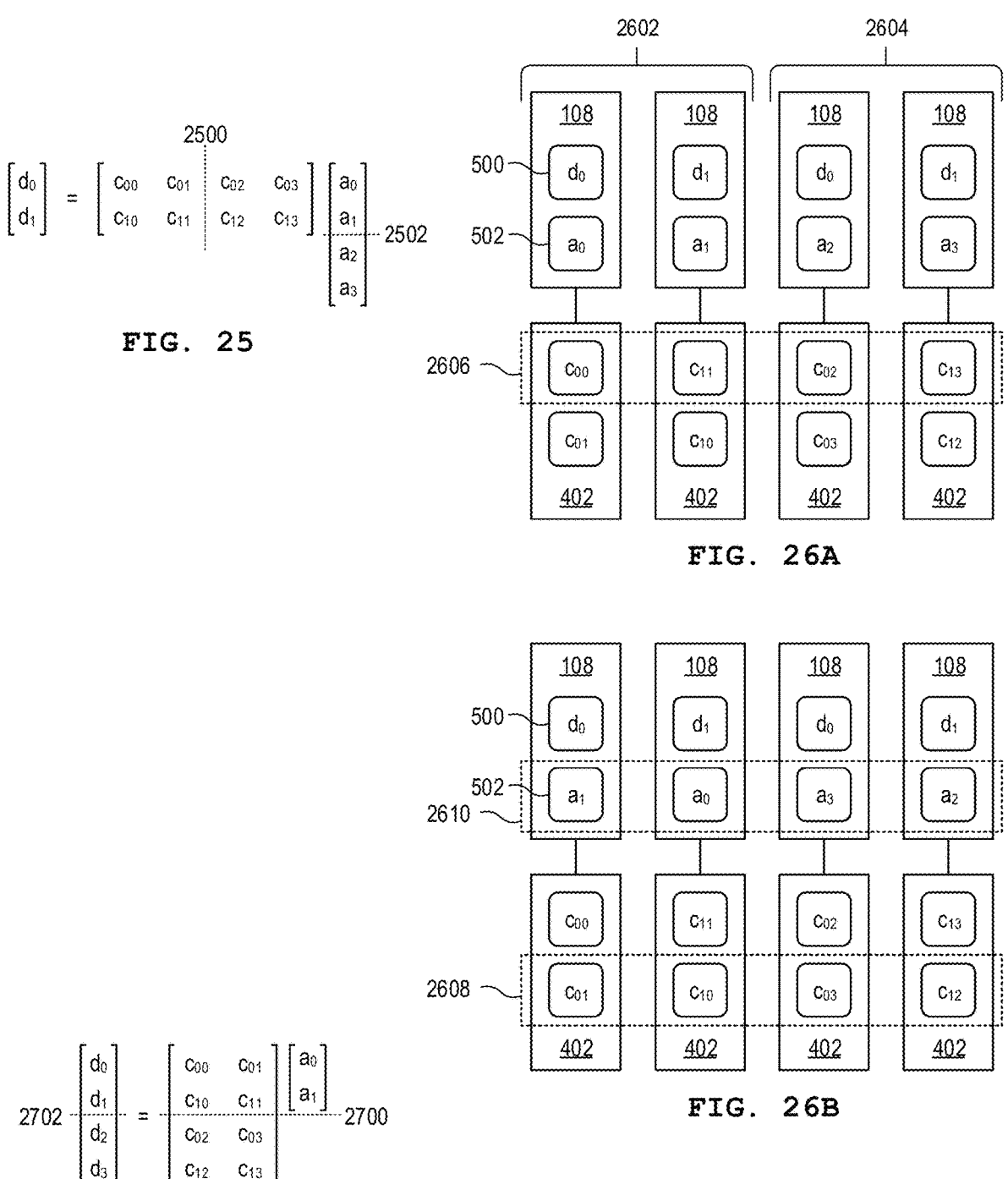
FIG. 25 is an equation for another example matrix multiplication carried out by processing elements and memory cells.
FIG. 26A is a schematic diagram of an example state of processing elements and memory cells during an operation based on the equation of FIG. 25.
FIG. 26B is a schematic diagram of another example state of processing elements and memory cells during the operation based on the equation of FIG. 25.
FIG. 27 is an equation for another example matrix multiplication carried out by processing elements and memory cells.

FIGS. 25, 26A, and 26B show an example of a matrix multiplication with a non-square matrix using PEs 108 with registers 500, 502 and connected memory cells 402, configured as discussed herein. In this example, the larger dimension of the non-square matrix corresponds to the length of the input vector As shown in FIG. 25 at 2500, the non-square matrix may be divided into square submatrices and the input vector may be similarly divided, at 2502. As shown in FIG. 26A, each submatrix and respective portion of the input vector may be loaded into corresponding memory cells 402 and PE registers 502. In this example, PEs 108 and respective memory cells 402 indicated at 2602 perform operations relevant to the leftmost submatrix of coefficients and the topmost set of input vector components, while the PEs 108 and respective memory cells 402 indicated at 2604 perform operations relevant to the rightmost submatrix of coefficients and the bottommost set of input vector components. All PEs 108 perform operations in parallel and the coefficients are selected from the memory cells 402 for the respective operations, at 2606 (FIG. 26A) and 2608 (FIG. 26B). Further, as discussed elsewhere herein, input vector components may be rearranged between operations, as indicated at 2610. Alternatively or additionally, result vector components may be rearranged between operations. The result vector component $d_0$, $d_1$ for each respective portion of the computation 2602, 2604 may be combined (e.g., summed) to obtain the final result.

With reference to FIG. 27, the same principle applies when the larger dimension of the non-square matrix corresponds to the length of the result vector. The non-square matrix may be divided into square submatrices, at 2700, and the result vector may be similarly divided, at 2702. The computation may be treated as independent parallel computations using respective blocks of PEs 108 and memory cells 402. Result sub-vectors $[d_0, d_1]$ and $[d_2, d_3]$ for each respective portion of the computation may be combined (e.g., concatenated) to obtain the final result vector $[d0, d1, d2, d3]$.

Figure 28:
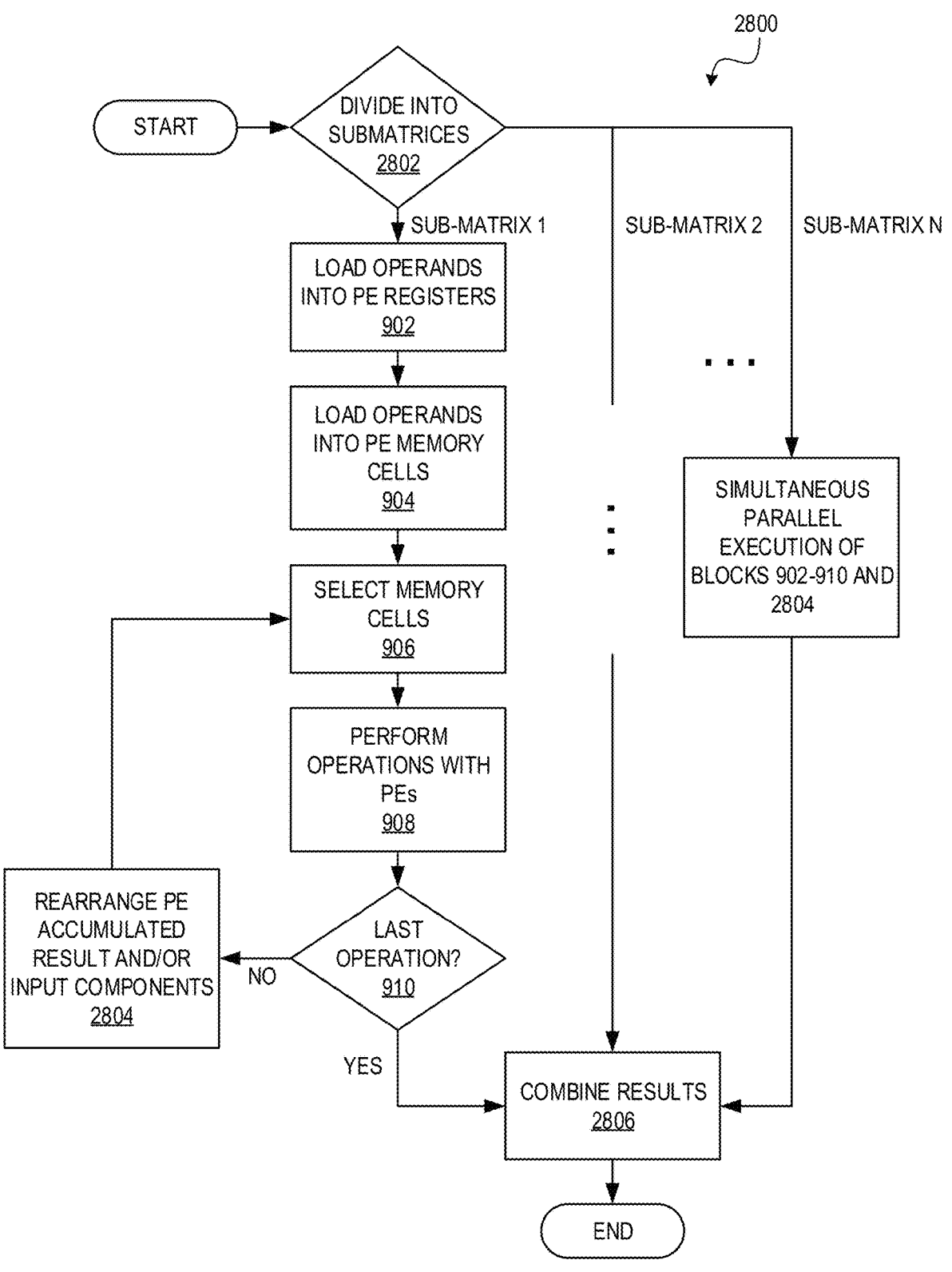
FIG. 28 is a flowchart of an example method of performing operations using processing elements and memory cells with non-square matrices.

FIG. 28 shows a method 2800 for performing operations with non-square matrices. The method 2800 may be performed with a computing device 100 or a similar device. The method 2800 may be implemented by a non-transitory machine-readable medium, such as RAM or EEPROM, that includes executable instructions. The method 2800 is similar to the methods 900, 2400 described above with respect to FIGS. 8 and 24, and only differences will be discussed in detail.

At block 2802, a non-square matrix is divided into a plurality of square submatrices. If the non-square matrix is not evenly divisible, the remaining non-square submatrix may be zero padded.

Blocks 902-910 perform an operation with each of the plurality of submatrices and block 2804 rearranges PE register contents to ready for the next operation. Blocks 902-910 and 2804 are performed simultaneously in parallel for each submatrix 1 through N, where N is two or more.

At block 902, operands (e.g., input vector components) are loaded into PE registers.

At block 904, operands (e.g., matrix coefficients) are loaded into PE memory cells.

At block 906, a set of memory cells may be selected for use in an operation. The set may be a row of memory cells. For example, a subset of coefficients of a matrix to be multiplied may be selected, one coefficient per PE.

At block 908, the same operation is performed by the PEs on the contents of the selected memory cells and respective PE registers. The operation may be performed substantially simultaneously with all relevant PEs. Results may be accumulated in PE registers.

Then, if a subsequent operation is to be performed, via block 910, accumulated result vector components and/or input vector components in the PE registers may be rearranged, at block 2804, to obtain a next arrangement. A next set of memory cells is then selected at block 906, and a next operation is performed at block 908. For example, a sequence of memory cells may be selected during each cycle and data in the PE registers may be rearranged to correspond to the sequence of memory cells, so as to perform a matrix multiplication. In other examples, other computations may be performed.

After block 910 indicates that the sequence of operations is complete for all sub-matrices, then the result vectors obtain for the sub-matrices may be combined, at block 2806, to obtain a final result vector corresponding to the non-square matrix. This may include adding the results vector components, joining result vectors, or similar combining logic.

As should be apparent from the above discussion, the techniques discussed herein are suitable for low-power neural-network computations and applications. Further, the techniques are capable of handling a large number of computations with flexibility and configurability.

It should be recognized that features and aspects of the various examples provided above can be combined into further examples that also fall within the scope of the present disclosure. In addition, the figures are not to scale and may have size and shape exaggerated for illustrative purposes.

What is claimed is:

1. A processing device comprising:
a two-dimensional array of processing elements, each processing element including:
an arithmetic logic unit to perform an operation;
an input selector to select input to the processing element from one of its neighboring processing elements;
an output selector to select output from the processing element to a different one its neighboring processing elements; and
interconnections among the array of processing elements to provide direct communication between each processing element and its neighboring processing elements; and
a controller connected to the array of processing elements, the controller configured to:
load an input vector into the array of processing elements;
divide a non-square matrix of coefficients into a plurality of square submatrices of coefficients;
load each square submatrix of coefficients into the array of processing elements as serialized coefficients;

control the array of processing elements to perform a computation with each loaded square submatrix of coefficients and the input vector by:
performing a parallel operation with the serialized coefficients in the array of processing elements and the input vector;
accumulating a result vector; and
rotating the result vector in the array of processing elements and repeating the performing of the parallel operation and the accumulating until the operation is complete; and
when each of the computations is complete, outputting the result vector.

2. The processing device of claim 1 wherein the controller is further configured to:
combine the result vector of each of the computations to obtain a final result vector corresponding to the non-square matrix of coefficients.

3. The processing device of claim 1 wherein the controller is further configured to:
divide the input vector into a plurality of input vector portions, each of the plurality of input vector portions corresponding to one of the plurality of square submatrices of coefficients; and
perform the computation with each loaded square submatrix of coefficients and its corresponding input vector portion.

4. A system comprising a controller and a two-dimensional array of processing elements, wherein the controller is configured to:
load an input vector into the array of processing elements;
divide a non-square matrix of coefficients into a plurality of square submatrices of coefficients;
load each square submatrix of coefficients into the array of processing elements as serialized coefficients;
control the array of processing elements to perform a computation with each loaded square submatrix of coefficients and the input vector by:
performing a parallel operation with the serialized coefficients in the array of processing elements and the input vector;
accumulating a result vector; and
rotating the result vector in the array of processing elements and repeating the performing of the parallel operation and the accumulating until the operation is complete; and
when each of the computations is complete, outputting the result vector.

5. The controller of claim 4 further configured to:
combine the result vector of each of the computations to obtain a final result vector corresponding to the non-square matrix of coefficients.

6. The controller of claim 4 further configured to:
divide the input vector into a plurality of input vector portions, each of the plurality of input vector portions corresponding to one of the plurality of square submatrices of coefficients; and
perform the computation with each loaded square submatrix of coefficients and its corresponding input vector portion.

* * * * *